(12) United States Patent
Bourque et al.

(10) Patent No.: US 12,123,465 B2
(45) Date of Patent: Oct. 22, 2024

(54) MULTI-PIECE BUSHING

(71) Applicant: LOCKHEED MARTIN CORPORATION, Bethesda, MD (US)

(72) Inventors: Richard T. Bourque, Oxford, CT (US); Erik M. Byrne, Stratford, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 152 days.

(21) Appl. No.: 17/507,958

(22) Filed: Oct. 22, 2021

(65) Prior Publication Data
US 2023/0128071 A1     Apr. 27, 2023

(51) Int. Cl.
F16C 43/02     (2006.01)
F16C 17/02     (2006.01)
F16C 35/02     (2006.01)

(52) U.S. Cl.
CPC .............. *F16C 43/02* (2013.01); *F16C 17/02* (2013.01); *F16C 35/02* (2013.01)

(58) Field of Classification Search
CPC ......... F16B 4/004; F16C 17/02; F16C 23/045
USPC ............................................................. 16/2.1
See application file for complete search history.

(56) References Cited

U.S. PATENT DOCUMENTS

| | | | | |
|---|---|---|---|---|
| 5,286,014 A * | 2/1994 | Chakko | | F16C 17/10 267/293 |
| 6,170,812 B1 * | 1/2001 | Nicoles | | F16F 1/38 267/281 |
| 6,474,631 B2 * | 11/2002 | Hadano | | F16F 1/3856 267/140.3 |
| 7,100,264 B2 | 9/2006 | Skinner et al. | | |
| 7,325,796 B2 * | 2/2008 | Moreland | | F16F 1/3842 267/293 |
| 8,542,799 B1 * | 9/2013 | Rogers | | H01J 35/10 378/132 |
| 8,568,034 B2 * | 10/2013 | Johnson | | B23P 9/025 384/295 |
| 10,155,424 B1 * | 12/2018 | Elterman | | B60G 7/001 |
| 2005/0223546 A1 * | 10/2005 | Klier | | F16C 17/10 29/898.09 |
| 2007/0059093 A1 | 3/2007 | Chun et al. | | |
| 2009/0226123 A1 * | 9/2009 | Klein | | F16C 17/10 384/294 |
| 2009/0304315 A1 * | 12/2009 | Johnson | | B23P 9/025 29/898.07 |

(Continued)

*Primary Examiner* — Long T Tran
*Assistant Examiner* — James J Kim
(74) *Attorney, Agent, or Firm* — Foley & Lardner LLP

(57) ABSTRACT

A bushing assembly for a structure having a first aperture is provided. The bushing assembly includes a first component configured to be received by the first aperture and having a second aperture. A maximum width of the first component defines an outer diameter. The bushing assembly further includes a second component positioned outside of the first aperture and coupled to the first component, the second component having a third aperture extending through the second component. The third aperture is dimensioned so as to be equivalent to the outer diameter of the first component, and the first component and the second component are formed as discrete components of the bushing assembly.

15 Claims, 17 Drawing Sheets
(11 of 17 Drawing Sheet(s) Filed in Color)

(56) References Cited

U.S. PATENT DOCUMENTS

2013/0061423 A1 3/2013 Ahern et al.
2014/0011622 A1* 1/2014 Sone ................... F16H 57/0471
　　　　　　　　　　　　　　　　　　　475/159

* cited by examiner

MULTI-PIECE BUSHING

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present disclosure relates to a multi-piece bushings. More specifically, the present disclosure relates to a multi-piece flanged bushing that is configured to reduce local stress concentrations experienced by a bushing.

BACKGROUND

Bushings may be inserted into an opening or hole of a structure when coupling the structure to another structure. For example, a bushing may be positioned within an opening of one or more structures and a fastener may be inserted into the bushing to couple the one or more structures to one another. The bushing may reduce the likelihood of damage to the opening of the one or more structure and/or the fastener while the one or more structures are in a loaded state.

SUMMARY

In some configurations, in a loaded state, openings or holes in a structure may be the most prone to failure due to local stress concentrations proximate the openings or holes (e.g., as modeled by local stress concentration factors due to geometric irregularities in the structure). Further, when the one or more structures are loaded, a bushing may also be subjected to various loads, which may cause various local stress concentrations in the bushing. The bushing may also be susceptible to failure while in a loaded state. For example, the bushing may experience local stress concentrations in various areas (e.g., the ends of the bushing, the flange of the bushing, the shoulder of the bushing, etc.). These local stress concentrations may damage the bushing, which may result in failure of the bushing. Damage to the bushing may also result in damage to the fastener and/or the openings in the one or more structures.

According to various embodiments, a bushing assembly for a structure includes a first aperture including a first component configured to be received by the first aperture and including a second aperture, a maximum width of the first component defining an outer diameter, and a second component positioned outside of the first aperture and coupled to the first component, the second component including a third aperture extending through the second component, the third aperture being dimensioned so as to be equivalent to the outer diameter of the first component, and the first component and the second component being formed as discrete components of the bushing assembly.

According to various embodiments, the first component is coupled to the second component via a pressure fit. According to various embodiments, the first component is cold expanded into the structure and the second component. According to various embodiments, the first component and the second component define a quadrilateral shoulder. According to various embodiments, the first aperture defines a quadrilateral ledge, wherein the quadrilateral shoulder interfaces with the quadrilateral ledge. According to various embodiments, the first aperture extends through the structure, and the bushing assembly further includes a third component coupled to the first component and positioned outside of the first aperture and opposite the second component such that the structure is positioned between the second component and the third component, and the first component and the third component are discrete components. According to various embodiments, at least a portion of the bushing assembly is coated in an anti-fretting material.

According to various embodiments, a system includes a rotor head and a bushing configured to be installed in an opening of the rotor head. The bushing includes a tubular component extending between a first end and a second end, the tubular component defining an inner diameter and an outer diameter, wherein the outer diameter corresponds with a maximum width of the tubular component, and a ring coupled to the tubular component proximate the first end, the ring including a central opening penetrating through the ring, wherein a diameter of the central opening is substantially equivalent in size to the outer diameter.

According to various embodiments, the tubular component includes a layer containing residual compressive stress. According to various embodiments, the tubular component and the ring define a quadrilateral shoulder. According to various embodiments, the ring is a first ring, and the bushing further includes a second ring coupled to the tubular component proximate the second end, wherein the second ring is discrete from the first ring and the tubular component. According to various embodiments, at least a portion of the bushing is coated in an anti-fretting material.

According to various embodiments, a method of installing a multi-piece bushing in a structure includes providing a tubular component partially within the first aperture, wherein the tubular component includes a second aperture extending from a first end to a second end and defines an outer diameter corresponding with a maximum width of the tubular component, and coupling a ring to the tubular component proximate the first end such that the ring is positioned outside of the first aperture, wherein the ring includes a third aperture that extends completely though the ring, and wherein the third aperture is substantially the same size as the outer diameter.

According to various embodiments, the method includes providing a fastener within the tubular component such that the structure is coupled to the fastener. According to various embodiments, coupling the ring to the tubular component includes cold expanding the tubular component while the tubular component is partially within the first aperture. According to various embodiments, the ring is a first ring, and the method further includes coupling a second ring to the tubular component such that the second ring is positioned outside of the first aperture. According to various embodiments, the tubular component is coupled to the ring via a pressure fit. According to various embodiments, at least a portion of the first aperture and a portion of the ring are coated in an anti-fretting material. According to various embodiments, the tubular component includes a residual compressive stress layer. According to various embodiments, the method further includes cold expanding the tubular component while the tubular component is positioned within the first aperture, the first ring surrounds a portion of the tubular component, and the second ring surrounds a portion of the tubular component.

This summary is illustrative only and should not be regarded as limiting.

BRIEF DESCRIPTION OF THE FIGURES

The patent or application file contains at least one drawing executed in color. Copies of this patent or patent application publication with color drawing(s) will be provided by the Office upon request and payment of the necessary fee.

The disclosure will become more fully understood from the following detailed description, taken in conjunction with the accompanying figures, wherein like reference numerals refer to like elements, in which.

DETAILED DESCRIPTION

Figure 1:
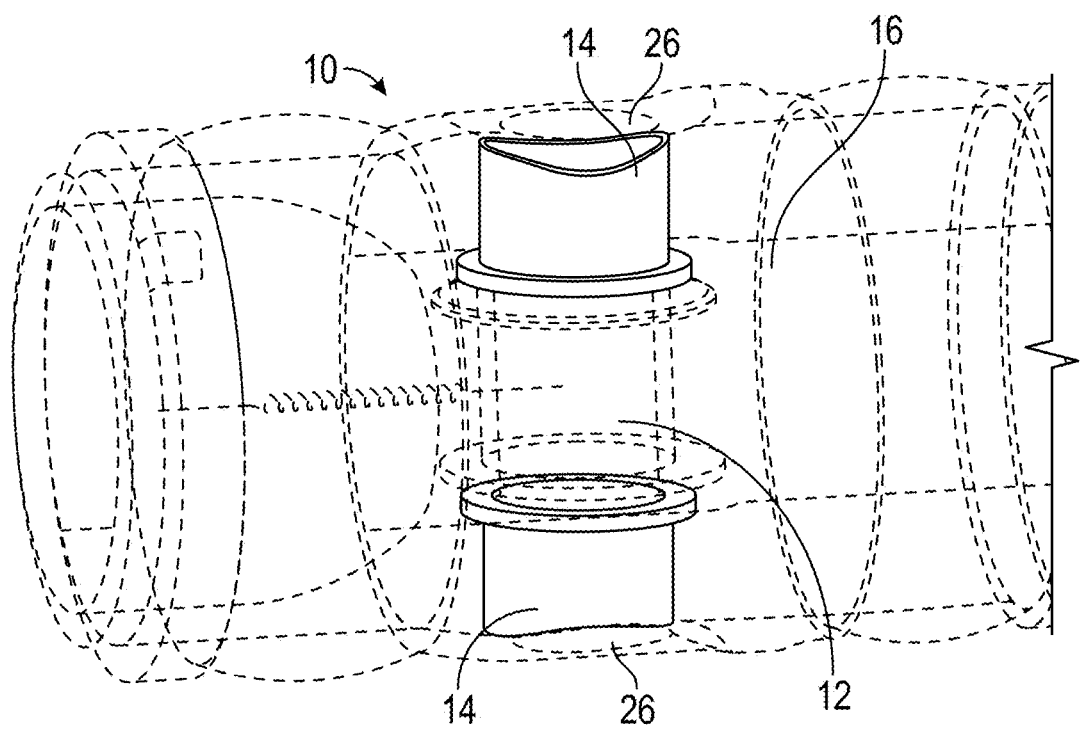
FIG. 1 is a perspective view of a fastening assembly, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Fastening assemblies may couple a first structure to a second structure. For example, the first structure and the second structure may each include an opening (e.g., a hole, an aperture, etc.) that is configured to receive a fastener. In certain situations, the fastening assembly may also include a bushing (e.g., a straight bearing, a liner, a sleeve, etc.) positioned within the opening. The bushing may protect the structures and the fastener from damage when the structure experience various loads. For example, a fastening assembly may be used to couple a first structure, such as a rotor head, to second structure, such as a blade (e.g., as a part of a helicopter, wind turbine, fixed wing aircraft propellers, etc.). In this example, the fastening assembly, the first structure, and the second structure may be in a loaded state as a result of various forces (e.g., the weight of the spar, the weight of the blade, centrifugal force resulting from rotation of the blade, etc.). The loads experience may cause local stress concentrations in the fastening assembly, the first structure, and the second structure. Generally speaking, the openings in the first structure and the second structure may experience relatively high stress concentrations due to the discontinuity in the structure at the opening. These local stress concentrations may be particularly undesirable if the first structure and/or the second structure are manufactured from a composite material.

Referring generally to the figures, a fastening assembly may include a fastener positioned within an inner opening of a bushing, which may be positioned within an opening of a structure. When the fastening assembly is under a loaded condition, the fastener may bend (e.g., elastic deformation, plastic deformation, etc.), which may result in local stress concentrations in the opening that the fastener is positioned within. One way to mitigate these local stress concentrations is to provide a bushing within the opening, which may help distribute some of the local stress concentrations across a larger area of the opening. However, the bushing may experience local stress concentrations as a result.

According to various embodiments, the bushing included in a fastening assembly may be a single piece bushing that includes a shoulder to further protect the opening and to prevent the bushing from translating within the opening. Due to the geometry of the single piece shoulder (e.g., the 90 degree angle at the shoulder), the bushing may experience relatively high local stress concentrations proximate the shoulder. These local stress concentrations may cause the bushing to deform or fail, which may result in the damage to the structure that the bushing is positioned within. One method of reducing the local stress concentrations is to add an undercut to the shoulder portion, as is discussed further below. Adding an undercut to the shoulder may reduce the local stress concentrations at the shoulder. However, adding the undercut may require additional machining of the bushing. Further, the opening in the structure may require additional machining (e.g., machining a chamfer in the structure) to accommodate the undercut.

Another method of reducing the local stress concentration is by providing a multi-piece bushing within the opening. As is discussed further herein, coupling (e.g., via a pressure fit) a straight bushing (e.g., a first bushing component, a tubular component, etc.) to a ring (e.g., a second bushing component), wherein the ring portion is a separate piece of material than the straight bushing, may reduce the local stress concentrations in the bushing. Further, using the multi-piece bushing may eliminate the need for an undercut at the shoulder of the bushing. Without the bushing undercut, the opening that the bushing is inserted into does not need a chamfered edge, thereby reducing the tensile installation stress at the opening. Furthermore, by cold expanding the straight bushing into the opening of the structure and into the ring simultaneously may result in a residual compressive stress layer that reduces the local stress concentrations of the fastening assembly is under loaded conditions.

According to various embodiments described herein, a bushing assembly is provided for a structure (e.g., a first structure) including a first aperture. The bushing assembly includes a first component (e.g., a tubular component, a sleeve, a straight bearing, etc.) configured to be received by the first aperture in the structure. The bushing assembly further includes a second aperture that is configured to receive a fastener (e.g., a bolt, a shaft, a lug, etc.). The maximum width of the first component defines an outer diameter. The bushing assembly further includes a second component positioned outside of the first aperture and coupled to the first component, the second component including a third aperture extending completely through the second component, wherein the third aperture is substantially (e.g., within about 1%) the same size as the outer diameter of the first component. Further, the second component is discrete from the first component (e.g., manufactured from separate pieces of material).

According to various embodiments, the first component is coupled to the second component via a pressure fit. According to various embodiments, the first component is cold expanded into the structure and the second component. According to various embodiments, the first component is simultaneously cold expanded into the structure and the second component, which may result in a layer of compressive residual stress in the first component, the second component, and/or the third component. According to various embodiments, the first component and the second component define a quadrilateral shoulder, as opposed to a shoulder that includes an undercut portion (e.g., chamfer, fillet, bevel, etc.). According to various embodiments, the first aperture defines a quadrilateral ledge, wherein the quadrilateral shoulder interfaces with the quadrilateral ledge. According to various embodiments, wherein the first aperture extends through the structure. According to various embodiments, the bushing assembly further includes a third component (e.g., another ring) coupled to the first component and positioned outside of the first aperture and opposite the second component such that the structure is positioned between the second component and the third component, wherein the third component is discrete from the first component. According to various embodiments, at least a portion of the first aperture and a portion of the bushing are coated in an anti-fretting material (e.g., epoxy, varnish, paint, etc.).

According to various embodiments described herein, a bushing is disclosed. The bushing includes a tubular component (e.g., a first component) extending between a first end and a second end, the tubular component defining an inner diameter configured to receive a fastener and an outer diameter, wherein the outer diameter corresponds with a maximum width of the tubular component. The bushing further includes a ring (e.g., a second component) coupled to the tubular component proximate the first end. The ring includes a central opening completely extending through the ring, wherein the central opening is substantially the same size (e.g., within 5%) as the outer diameter, and wherein the ring is discrete from the tubular component.

According to various embodiments, the tubular component is cold expanded into the ring such that the tubular component, the ring component, and/or the structure includes a residual compressive stress layer. According to various embodiments, the tubular component and the ring define a quadrilateral shoulder. According to various embodiments, the ring is a first ring, and the bushing further includes a second ring coupled to the tubular component proximate the second end, wherein the second ring is discrete from the first ring and the tubular component. According to various embodiments, at least a portion of the bushing is coated in an anti-fretting material.

According to various embodiments described herein, a method of installing a multi-piece bushing is disclosed, in particular, a method of installing such a bushing in a structure having a first aperture. The method includes providing a tubular component partially within the first aperture, wherein the tubular component includes a second aperture extending from a first end to a second end and defines an outer diameter corresponding with a maximum width of the tubular component, and coupling a ring to the tubular component proximate the first end such that the ring is positioned outside of the first aperture, wherein the ring includes a third aperture that extends completely though the ring, wherein the third aperture is substantially the same size as the outer diameter.

According to various embodiments, the method includes providing a fastener within the tubular component such that the structure is coupled to the fastener. The fastener may further be coupled to another structure, such that the two structures are coupled to one another. According to various embodiments, coupling the ring to the tubular component includes cold expanding the tubular component while the tubular component is partially within the first aperture. According to various embodiments, the ring is a first ring, and the method further includes coupling a second ring to the tubular component such that the second ring is positioned outside of the first aperture. According to various embodiments, the tubular component is coupled to the ring via a pressure fit. According to various embodiments, at least a portion of the first aperture, a portion of the ring, and a portion of the tubular component are coated in an anti-fretting material. According to various embodiments, the tubular component includes a residual compressive stress layer. According to various embodiments, the method further includes cold expanding the tubular component while the tubular component is positioned within the first aperture, the first ring surrounds a portion of the tubular component, and the second ring surrounds a portion of the tubular component.

Referring now to FIG. 1, a perspective view of a fastening assembly 10 is shown, according to an example embodiment. The fastening assembly 10 includes a fastener 12 that extends through an opening 26 in a structure 16. For example, the fastener 12 may be used to couple the structure 16 to another structure. Further, a first portion of the fastener 12 is positioned within the first bushing 14 and a second portion of the fastener 12 is positioned within the second bushing 14. The bushings 14 may protect the opening 26 in the structure 16 from damaged when the structure 16 is in a loaded state. For example, the structure 16 may be a part of a rotor assembly of a helicopter. As the rotor assembly rotates, the structure 16 may also rotate. As the structure 16 rotates, the fastening assembly 10 may be in a loaded state, as several forces (e.g., the weight of the spar, the weight of the blade, centrifugal force resulting from rotation of the blade, etc.) may cause localized internal stress concentrations within the various components of the fastening assembly 10. In particular, the fastener 12 may deform when the fastening assembly 10 is in the loaded state, which may contribute to local stress concentrations in the bushing 14, as discussed further below.

Figure 2:
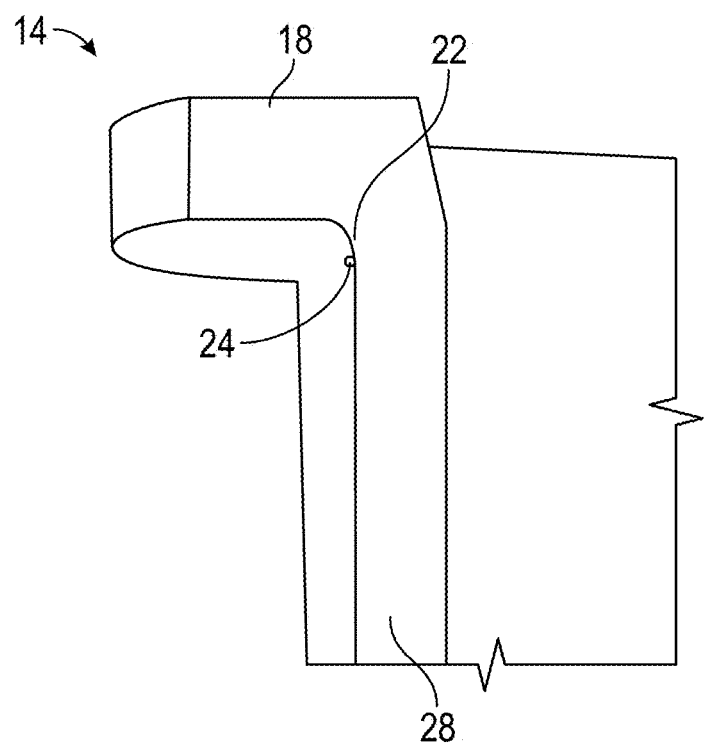
FIG. 2 is a stress distribution depiction of a bushing, according to an example embodiment.

Referring now to FIG. 2, a stress distribution depiction of the bushing 14 in a loaded state is shown, according to an example embodiment. The bushing 14 is made from a single piece of material. The bushing 14 includes a cylindrical portion 28 and a ring portion 18 that meet at a shoulder 22. As shown, the shoulder 22 includes an undercut portion such that the cylindrical portion 28 and the ring portion 18 do not form a right angle at the shoulder 22. As shown by the stress indicators, the maximum stress 24 experienced by the bushing 14 is proximate the shoulder 22. As shown, the maximum stress 24 includes a relatively high local stress concentration, and therefore, the bushing 14 may fail at the shoulder 22 when the fastening assembly 10 is under loaded conditions.

Figure 3A:
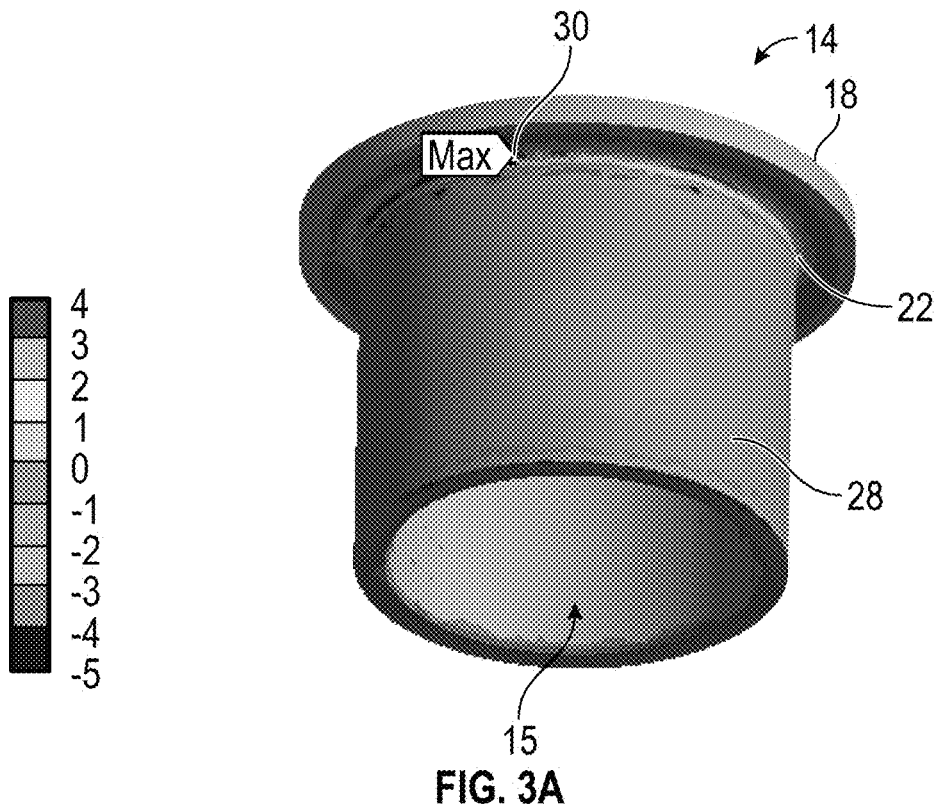
FIG. 3A is a stress distribution depiction of the residual stress in a bushing, according to an example embodiment.
Figure 3B:
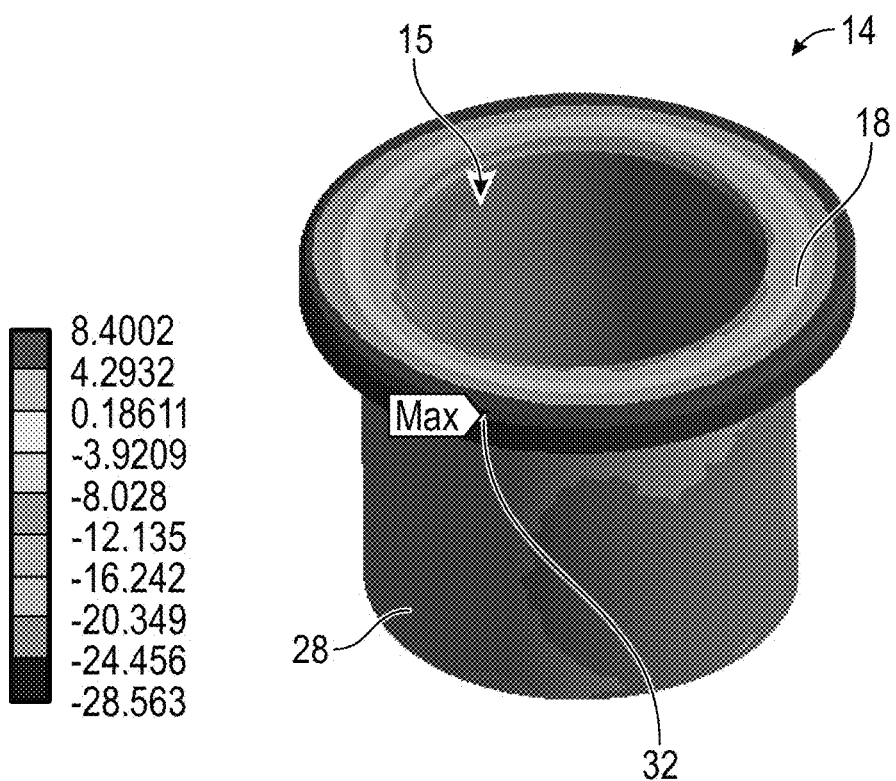
FIG. 3B is another stress distribution depiction of the residual stress in the bushing of FIG. 3A, according to an example embodiment.

Referring now to FIGS. 3A and 3B, stress distribution depictions of the radial residual stress and the hoop residual stress in the bushing 14 are shown, according to an example embodiment. For example, the bushing 14 may be installed into the opening 26 of the structure 16 (see FIG. 1) such that an aperture 15 in the bushing 14 may receive a fastener. The residual stress in the bushing 14 corresponds with the stress experienced by the bushing 14 when installed into the structure 16 and when the fastening assembly 10 is in the unloaded state. As shown, in FIG. 3, the bushing 14 experiences a relatively high local stress concentration 30 at the shoulder 22 of the bushing 14. Further, as shown in FIG. 3B the bushing 14 experiences a relatively high tensile hoop stress 32 proximate the outer diameter of the ring portion 18.

Figure 4A:
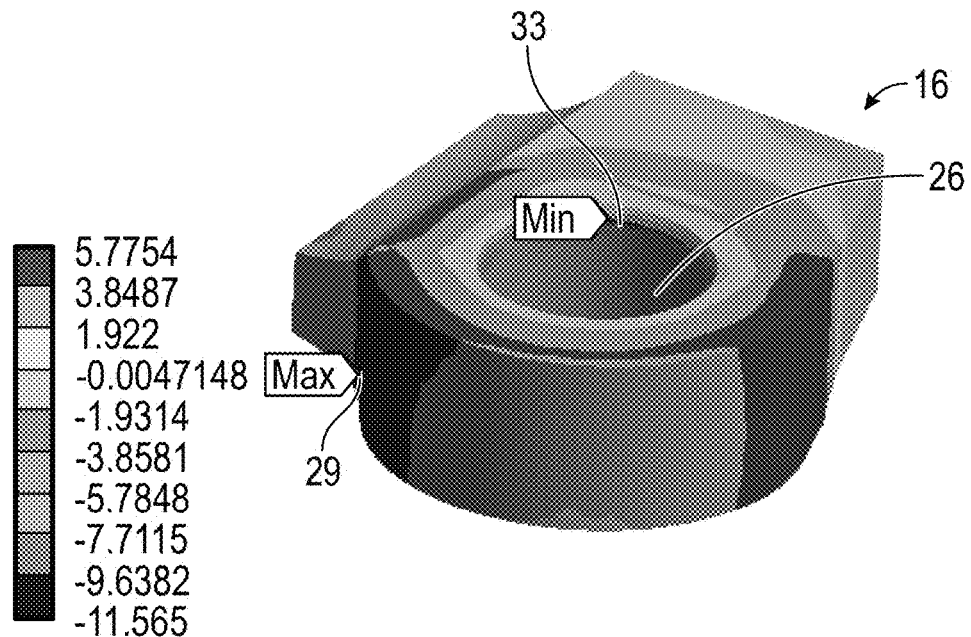
FIG. 4A is a stress distribution depiction of the residual stress in a structure, according to an example embodiment.
Figure 4B:
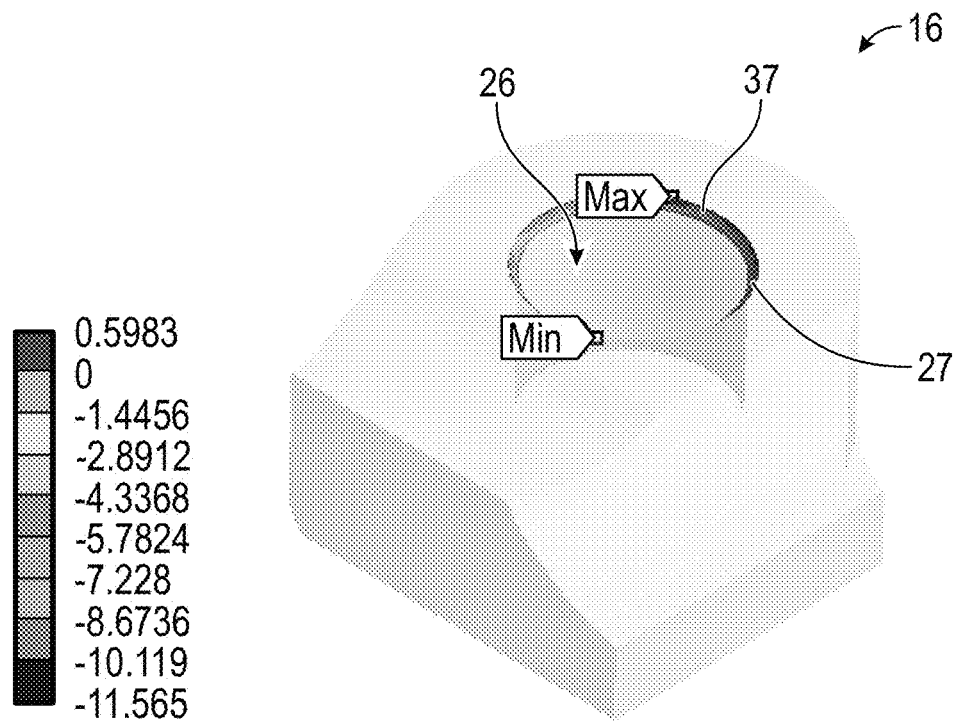
FIG. 4B is another stress distribution depiction of the residual stress in the structure of FIG. 4a, according to an example embodiment.

Referring now to FIGS. 4A and 4B, stress distribution depictions of the residual stress in the structure 16 are shown, according to an example embodiment. For example, the bushing 14 and the fastener 12 (see FIG. 1) may be installed into the opening 26 of the structure 16. The residual stress in the structure 16 corresponds with the stress experienced by the structure 16 when the bushing 14 and the fastener 12 are installed into the structure 16 and when the fastening assembly 10 is in the unloaded state. As shown, in FIG. 4A, the structure 16 experiences a relatively high local stress concentration 29 proximate an outer surface of the structure and residual compression 33 proximate the opening 26 in the structure. Further, as shown in FIG. 4B, the structure 16 experiences a relatively high local stress concentration 37 proximate the chamfer 27 of the structure.

Figure 5:
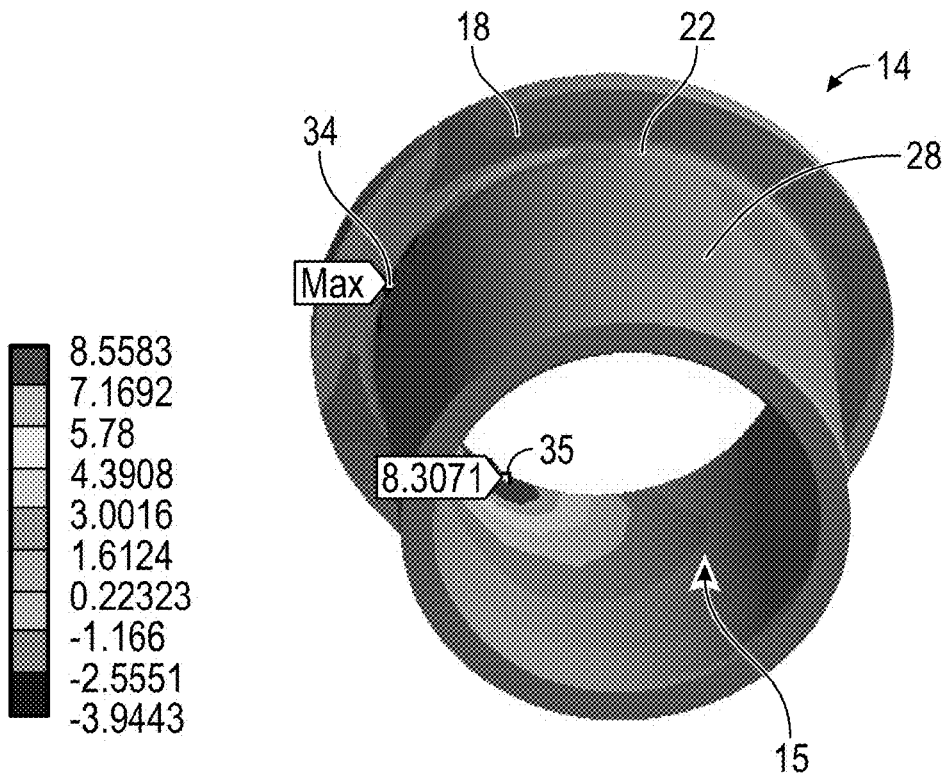
FIG. 5 is a stress distribution depiction of the bushing of FIG. 3A under loaded conditions, according to an example embodiment.
Figure 6:
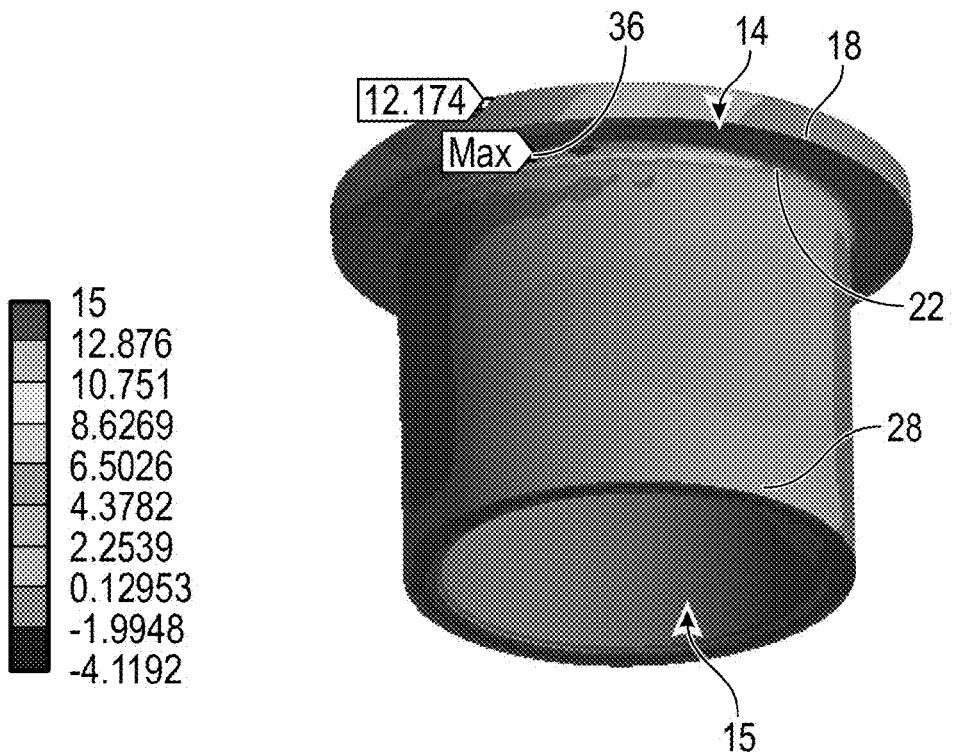
FIG. 6 is a stress distribution depiction of the bushing of FIG. 3A under loaded conditions, according to an example embodiment.

Referring now to FIGS. 5 and 6, vibratory and steady stress distribution depictions of the bushing 14 of FIG. 3A under loaded conditions are shown, according to an example embodiment. For example, the bushing 14 may be installed into the opening 26 of the structure 16 (see FIG. 1) such that an aperture 15 in the bushing 14 may receive a fastener. The fastening assembly 10 may be in a loaded state due to dynamic movement of the structure 16. As shown, the bushing 14 experiences relatively high local stress concentrations 34, 35, and 36 proximate the shoulder 22 of the bushing 14, which increases the risk of the ring portion 18 fracturing or otherwise failing. It should be appreciated that the stress distributions shown (e.g., the stress distributions shown in FIGS. 3A-9 and 17-29) are normalized gradients that do not show absolute values (e.g. in psi) but instead depict gradients of stresses relative to the maximum stress of FIG. 6.

Figure 7:
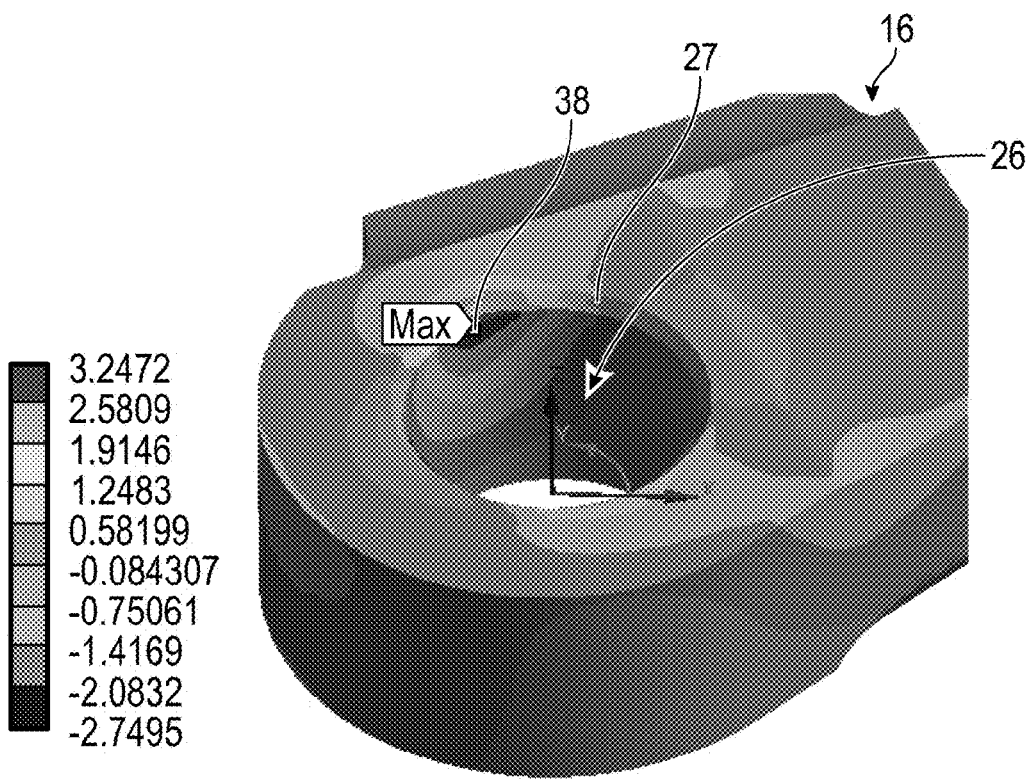
FIG. 7 is a stress distribution depiction of the stress in a structure under loaded conditions, according to an example embodiment.
Figure 8:
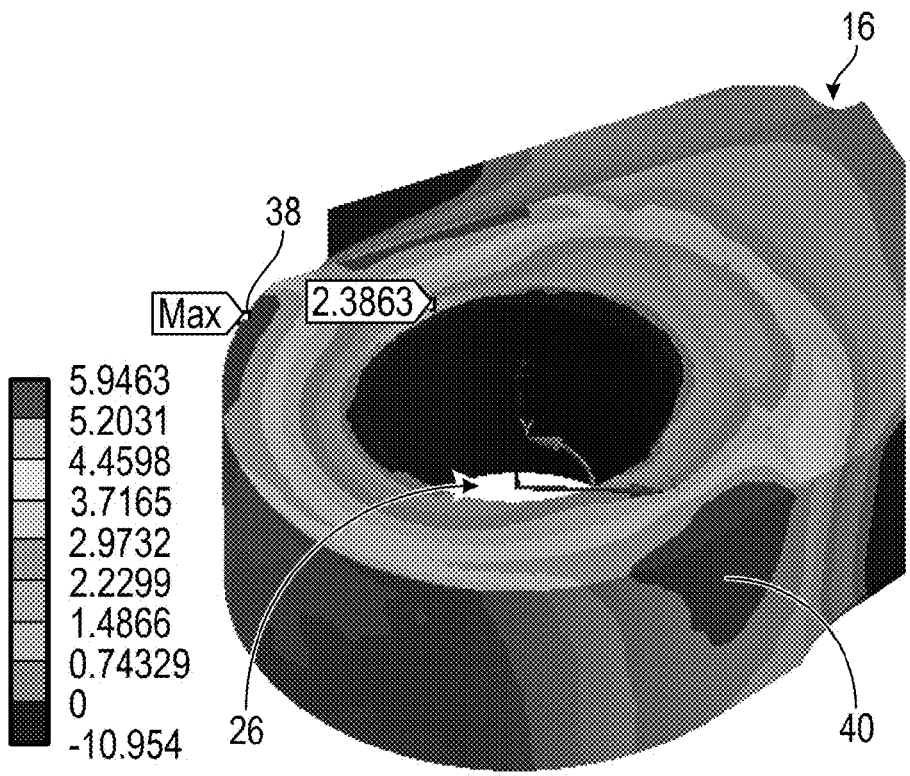
FIG. 8 is another stress distribution depiction of the stress in the structure of FIG. 7 under loaded conditions, according to an example embodiment.

Referring now to FIGS. 7 and 8 stress distribution depictions of the stress in a structure 16 under loaded conditions are shown, according to an example embodiment. For example, FIG. 7 illustrates the vibratory stress in the structure 16 under loaded conditions and FIG. 8 illustrates the steady stress in the structure 16 under loaded conditions. As shown, the structure 16 experiences a relatively high local vibratory stress concentration 38 proximate the chamfer 27. Further, the structure experiences relatively high local steady stress concentrations 39, 40 proximate the outer surface of the structure 16.

Figure 9:
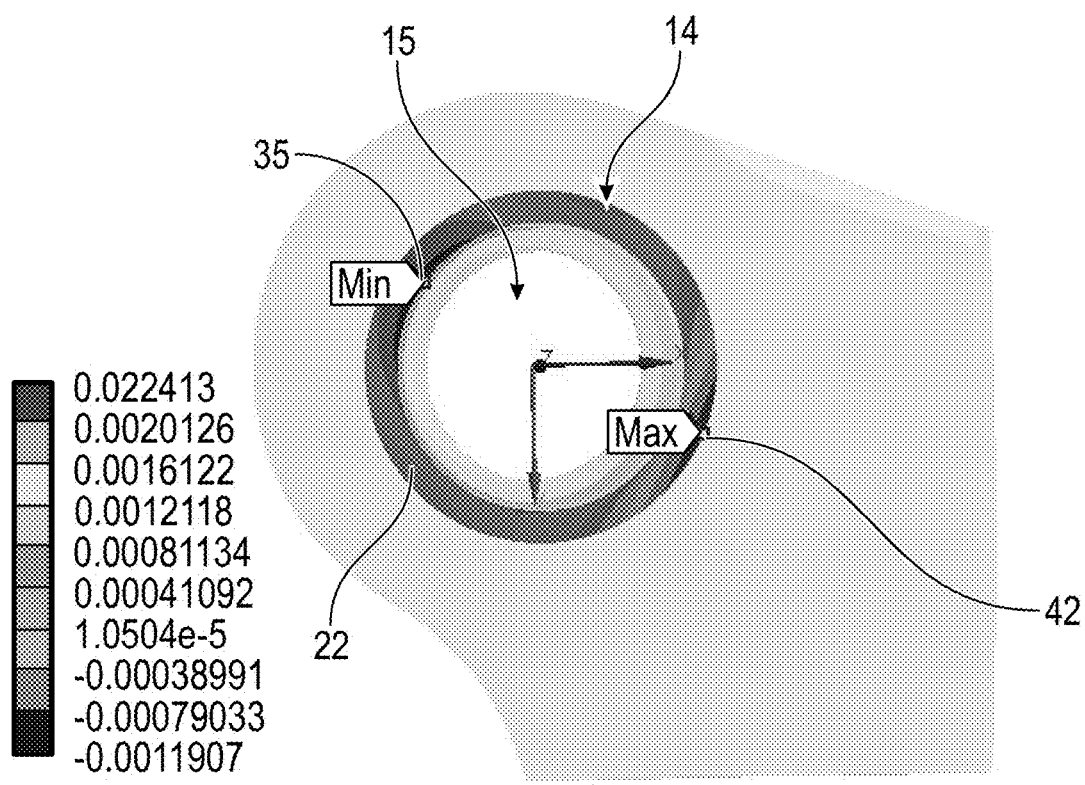
FIG. 9 is a deformation distribution depiction of the bushing of FIG. 3A, according to an example embodiment.

Referring now to FIG. 9, a deformation distribution depiction of the bushing 14 of FIG. 3A is shown, according to an example embodiment. As shown, the ring portion 18 of the bushing 14 experiences relatively high amounts of deformation 42 proximate an outer portion of the ring portion 18. The deformation experienced by the bushing 14 is at least partially a result of flange cupping from the cold expansion process.

Figure 10:
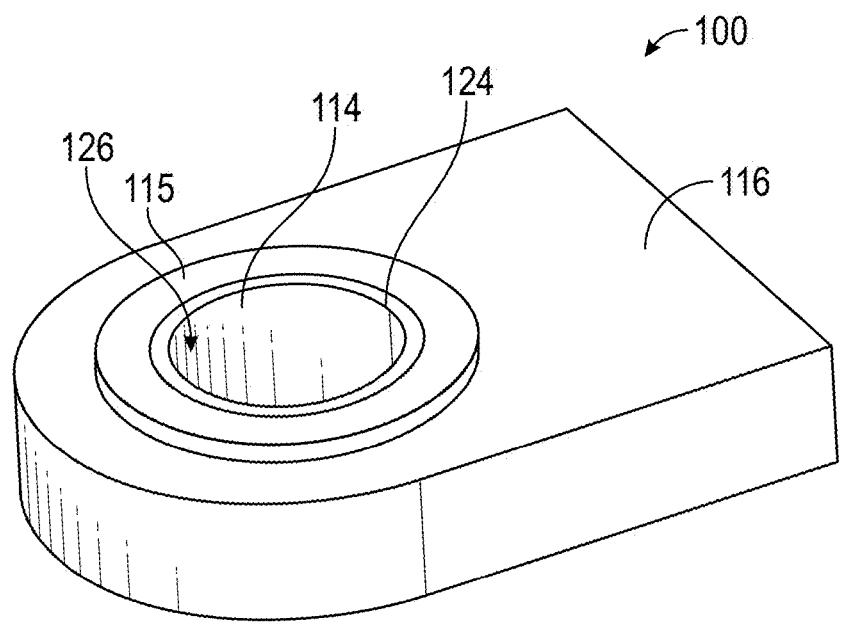
FIG. 10 is a perspective view of a fastening assembly, according to an example embodiment.
Figure 11:
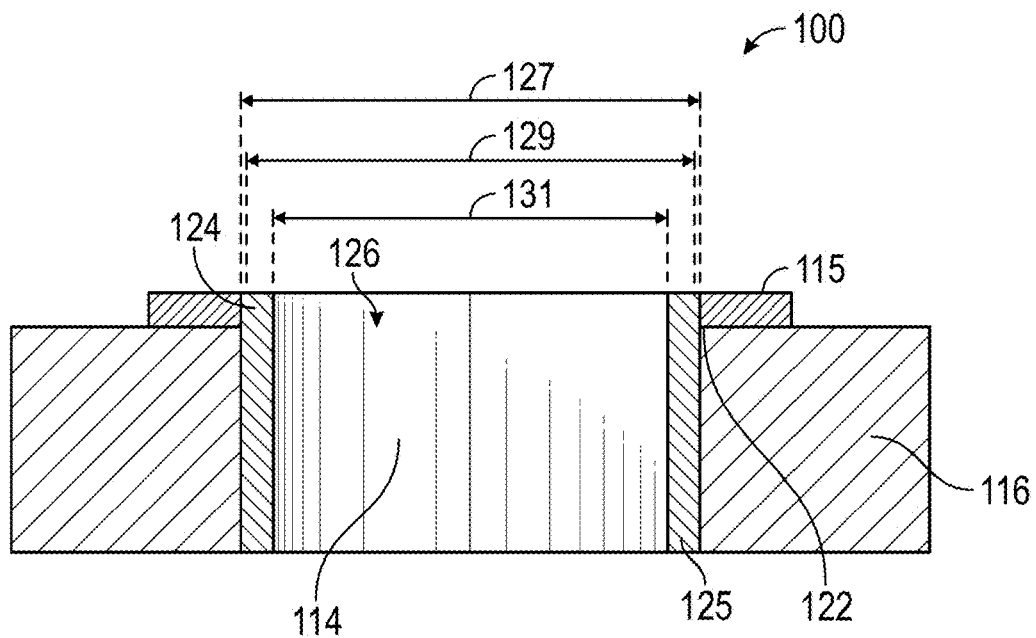
FIG. 11 is a cross sectional view of the fastening assembly of FIG. 10, according to an example embodiment.

Referring now to FIGS. 10 and 11, a perspective view of a fastening assembly 100 and a cross sectional view of the fastening assembly 100 are shown, according to an example embodiment. As shown, the fastening assembly 100 includes a structure 116 (e.g., a rotor head or another portion of a rotor) that defines an opening 126 (e.g., an aperture) with a bushing positioned at least partially within the opening 126. The bushing includes a cylindrical component 114 and a ring 115, which are separate and discrete (e.g., manufactured from different pieces of material). According to various embodiments, the bushing is configured to receive a fastener such that the structure 116 may be coupled to another structure, as is discussed further below. As shown, a first end 124 of the cylindrical component 114 is positioned outside of the opening 126. Further, a second end 125 of the cylindrical component 114 is positioned within the opening.

As shown, the ring 115 is coupled to the cylindrical component 114 proximate the first end 124. For example, the ring 115 may be coupled to the cylindrical component 114 via a pressure fit.

According to various embodiments, the cylindrical component 114 may be pressure fit into the ring 115 and the structure 116 via cold expansion. For example, the cylindrical component 114 may have an outer diameter 127 that is marginally smaller (e.g., less than approximately 5% smaller) than the opening 126 (e.g., the inner diameter of the opening) and marginally smaller (e.g., less than approximately 5% smaller) than an inner diameter 129 that extends completely through the ring 115. Once the cylindrical component 114 is inserted into the opening 126 and the ring 115 is positioned around the cylindrical component 114, a mandrel may be inserted into the cylindrical component 114. The mandrel has a diameter that is larger than an inner diameter 131 of the cylindrical component 114. As a result, inserting the mandrel will cause the cylindrical component 114 to plastically deform and expand such that the cylindrical component 114 is coupled to the ring 115 and the structure 116. Thus, according to various embodiments, once the fastening assembly 100 is installed (e.g., cold expanded into place), the outer diameter 127, the inner diameter of the opening 126 in the structure 117, and the inner diameter 129 are all substantially equal in size (e.g., the diameters are within approximately 2% of each other). As shown, the upper surface of the ring 115 is flush with the first end 124 of the cylindrical component 114, which may reduce wear damage if the bushing rubs against another part. Further, some or all of the interface between the inner diameter opening 126 in the structure 116, the cylindrical component 114, and/or the ring 115 may be coated in an anti-fretting material (e.g., bluecoat epoxy, varnish, paint, etc.).

The multi-piece bushing shown provides several benefits, which are discussed further herein. For example, as shown, the ring 115 and the cylindrical component 114 form a quadrilateral shoulder 122, thereby eliminating the need to machine a chamfer into the structure 116 (e.g., to accommodate for an undercut portion in the bushing). However, since the ring 115 and the cylindrical component 114 are manufactured from different pieces of material, the multi-piece bushing does not experience as much of a local stress concentration at the shoulder 122 as a single piece bushing (e.g., the bushing 14) under similar conditions. Additionally, unlike a traditional washer, the pressure fit between the ring 115 and the cylindrical component 114 prevents the ring from sliding and/or spinning about the cylindrical component 114.

Further, cold expanding the cylindrical component 114 may result in a layer of residual compressive stress in the cylindrical component 114, the ring 115, and/or the structure 116, which increases the fatigue strength of these components. The multi-piece bushing also results in less residual tension at the flange radius (e.g., the ring portion 18 discussed above) when the bushing is installed into the structure 116. The multi-piece bushing further reduces the steady and vibratory stress in the structure 116 compared to a single-piece bushing. Further, according to various embodiments, the ring 115 and the cylindrical component 114 may be manufactured from different materials based on desired characteristics of each component. For example, the ring 115 may be manufactured from a material for galling prevention, wear prevention, a lower friction coefficient, etc. (e.g., aluminum, bronze, aluminum bronze, a copper nickel tin alloy, a metal matrix composite (MMC), an MMC that includes ceramic core particles, etc.) while the cylindrical component 114 may be manufactured from a material with relatively high strength (e.g., steel, 15-5 H1025 stainless steel, etc.).

Figure 12:
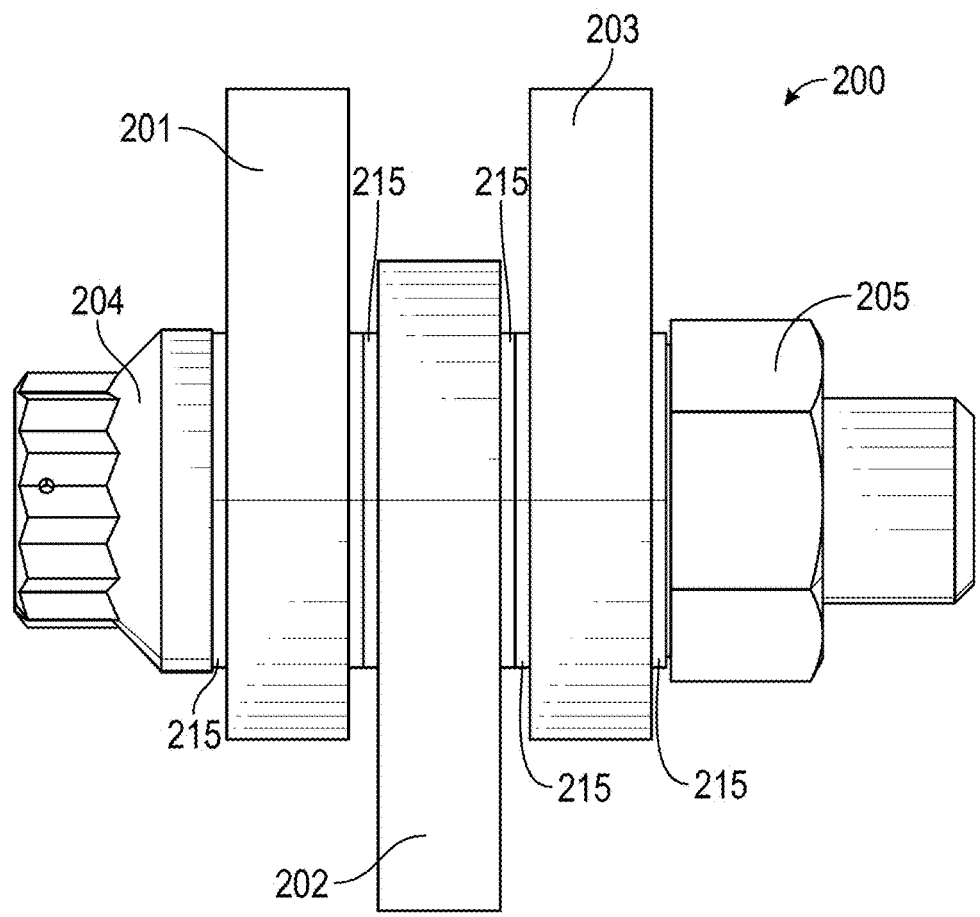
FIG. 12 is a perspective view of another fastening assembly, according to an example embodiment.

Referring now to FIG. 12, a perspective view of another fastening assembly 200 is shown, according to an example embodiment. It should be appreciated that the fastening assembly 200 may share some or all of the same features and characteristics of the fastening assembly 100 discussed above. As shown, the fastening assembly 200 couples a first structure 201 to a second structure 202 and a third structure 203 via a fastener 204 (e.g., a bolt) and a securing component 205 (e.g., a nut). The fastening assembly 200 further includes a plurality of multi-piece bushings, which may be similar to the multi-piece bushings discussed above with respect to FIGS. 10 and 11. The multi-piece bushings are at least partially positioned within each of the structures 201, 202, and 203, as is discussed further below with respect to FIGS. 13 and 14.

Figure 13:
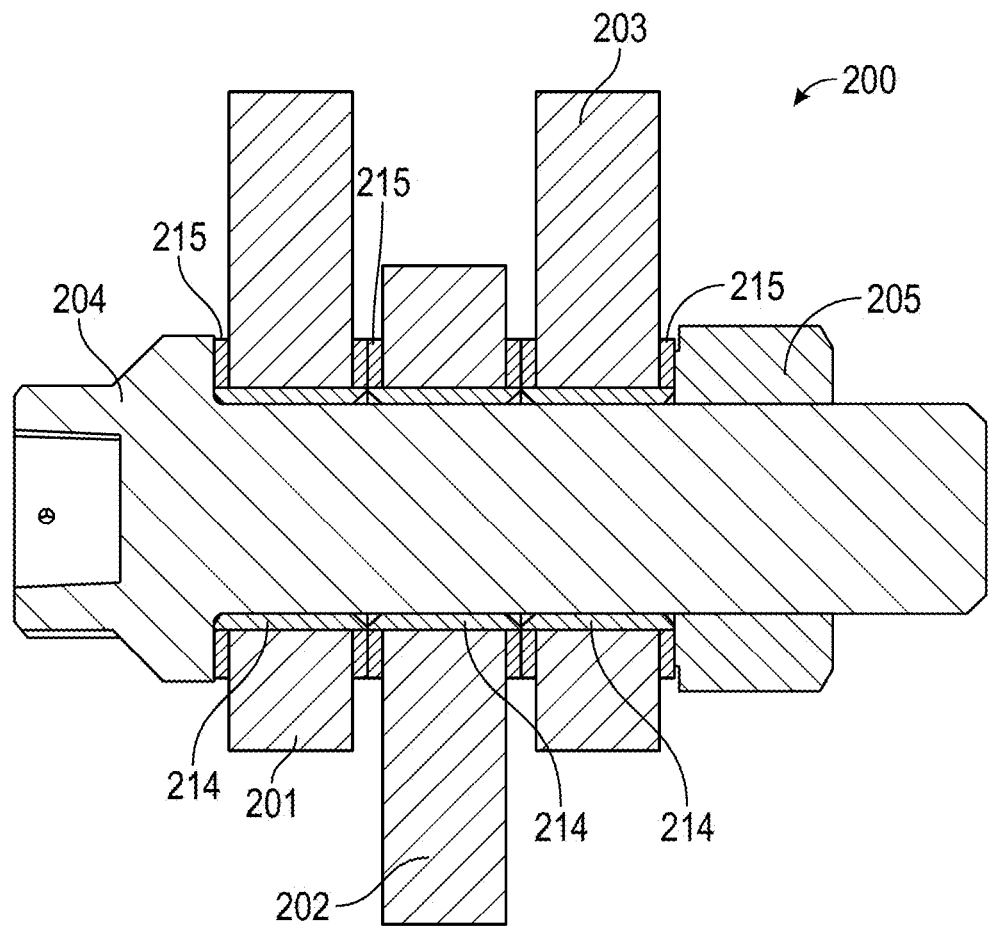
FIG. 13 is a cross sectional view of the fastening assembly of FIG. 12, according to an example embodiment.
Figure 14:
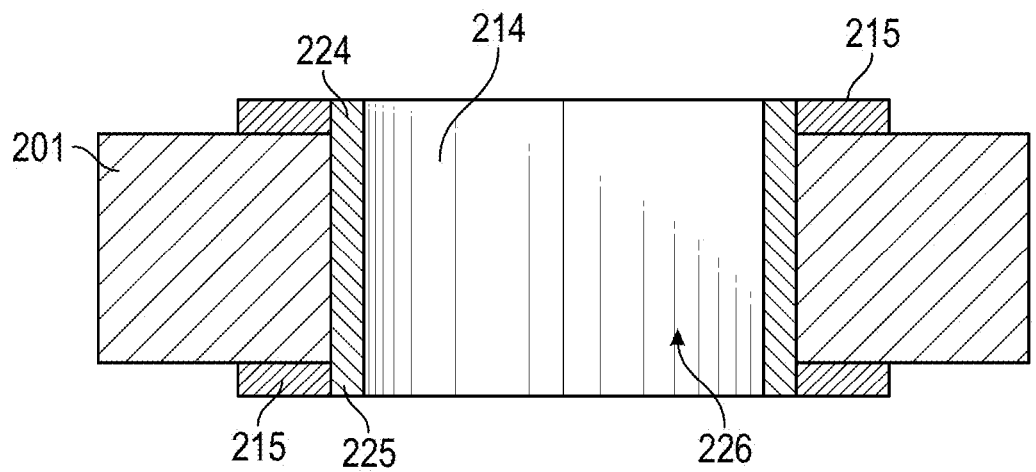
FIG. 14 is a partial cross sectional view of the fastening assembly of FIG. 12, according to an example embodiment.

Referring now to FIGS. 13 and 14, a cross sectional view of the fastening assembly 200 of FIG. 12 and a cross section view of a multi-piece bushing are shown, according to an example embodiment. As shown in FIG. 13, a cylindrical component 214 is positioned within each of the structures 201, 202, and 203. The cylindrical component 214 may be the same or similar to the cylindrical component 114 discussed above. Further, a ring 215 is coupled to a first end 224 and a second end 225 of each cylindrical portion. Each ring 215 may be the same or similar to the ring 115 described above. Each ring 215 may be coupled to the cylindrical component 214 in a similar manner (e.g., pressure fit, cold expanded, etc.) as described above. It should be appreciated that while the example embodiment shown includes two rings 215 for each cylindrical component 214, according to other embodiments, a single ring 215 may interface with two cylindrical components 214. For example, a single ring 215 may receive a first end 224 of a first cylindrical component 214 and a second end 225 of a second cylindrical component 214.

According to various embodiments, when assembling the fastening assembly 200, the plurality of cylindrical components 214 may each be positioned within their respective structures 201, 202, and 203 and a ring 215 may be positioned coupled to the cylindrical components 214 proximate a first end 224 and a second end 225 of each cylindrical component 214. A mandrel may then be inserted through all of the openings 226 such that the cylindrical components 214 are cold expanded within the structures 201, 202, and 203, such that the rings 215 are coupled to the respective cylindrical portions 214. Then, as shown, the fastener 204 may be inserted such that the fastener 204 extends through the openings 226 of the multi-piece bushings positioned partially within each of the structures 201, 202, and 203. The fastener 204 is then received by the securing component 205 (e.g., via a plurality of threads), thereby coupling the structures 201, 202, and 203 to one another.

Figure 15:
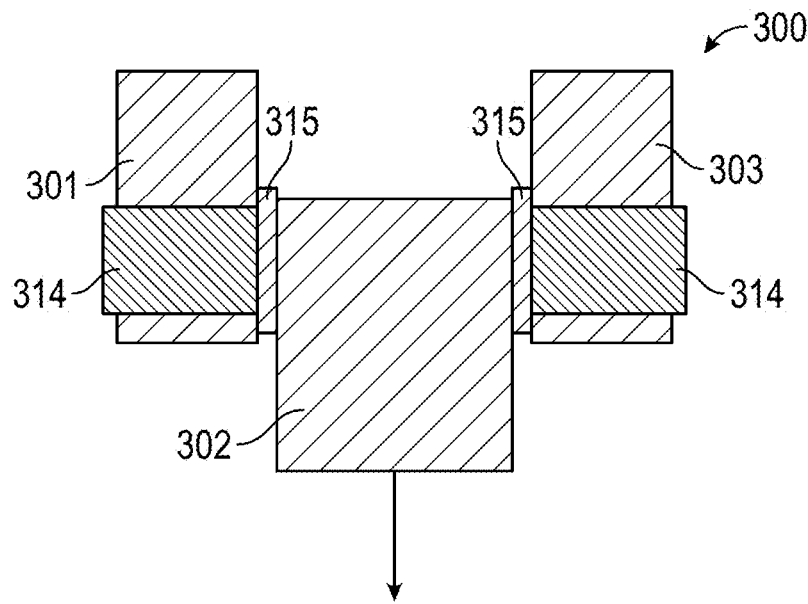
FIG. 15 is a schematic view of a fastening assembly, according to an example embodiment.
Figure 16:
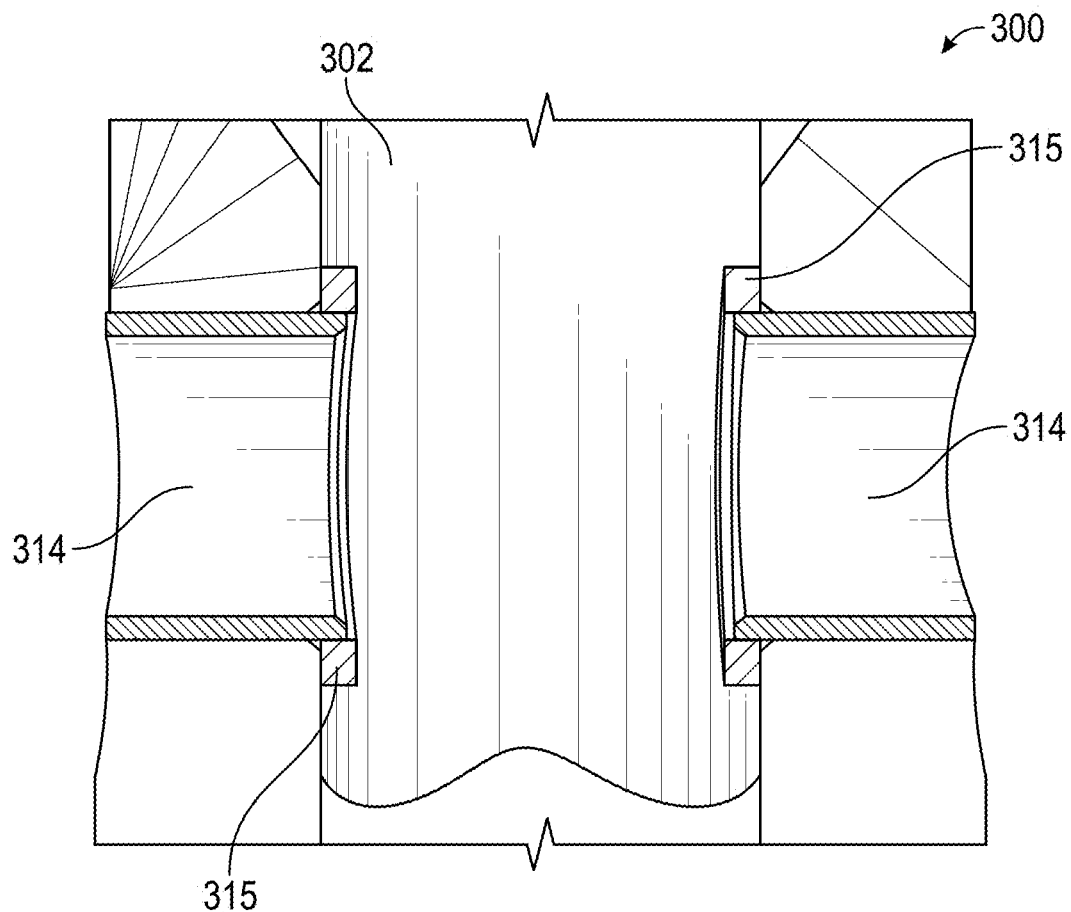
FIG. 16 is a partial cross sectional view of a fastening assembly, according to an example embodiment.

Referring now to FIGS. 15 and 16, a schematic view and a cross sectional view of a fastening assembly 300 are shown, according to an example embodiment. The fastening assembly 300 may be similar to the fastening assemblies 100, 200 described further herein. The fastening assembly 300 couples a first structure 301 to a second structure 302 and a third structure 303 and includes a plurality of multi-piece bushings. Each multi-piece bushing includes a cylindrical component 314 and a ring 315. The cylindrical component 314 may be the same or similar to the cylindrical components 114, 214 described further herein. The ring 315 may be the same or similar to the rings 115, 215 described further herein.

Figure 17:
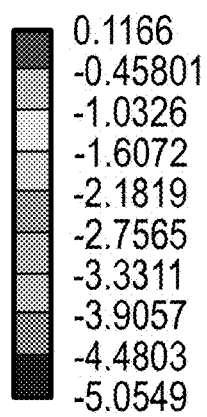
FIG. 17 is a stress distribution depiction of the residual stress in a component of a bushing, according to an example embodiment.
Figure 17:
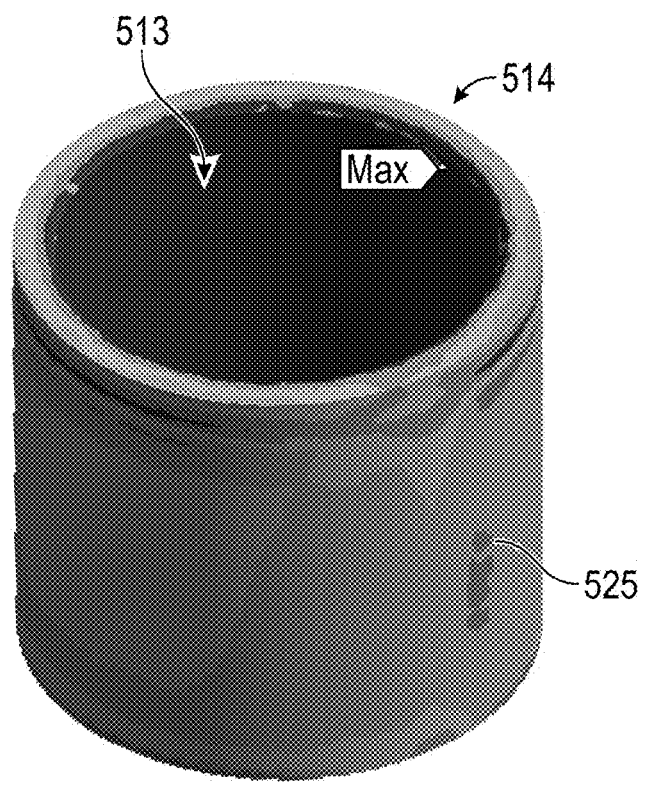
Figure 18:
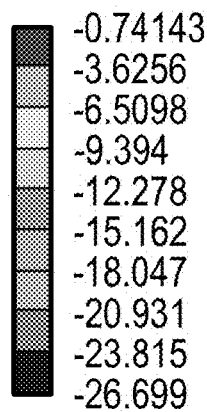
FIG. 18 is another stress distribution depiction of the residual stress in the component of a bushing of FIG. 17, according to an example embodiment.
Figure 18:
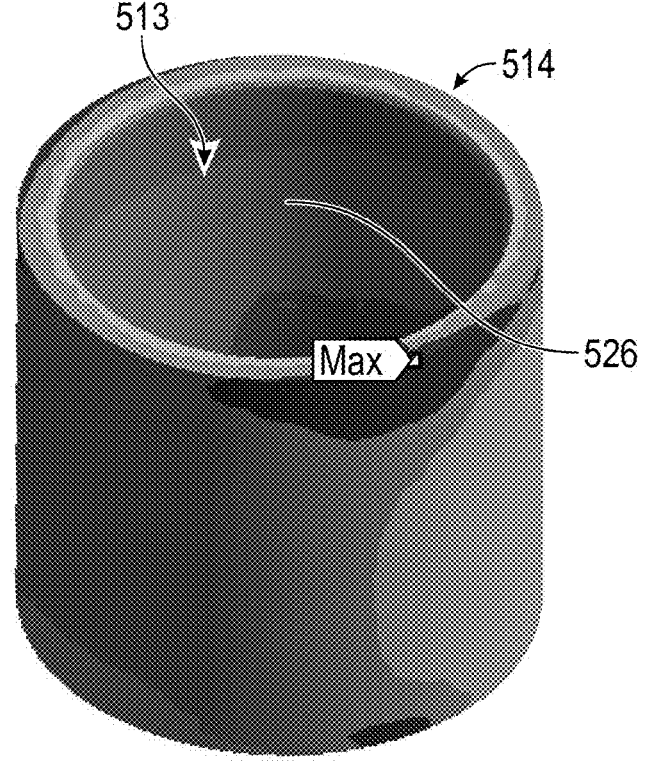
Figure 19:
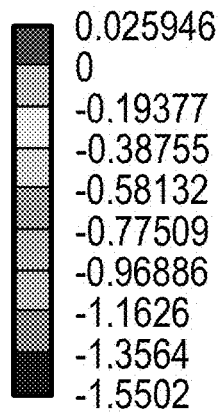
FIG. 19 is a stress distribution depiction of the residual stress in another component of a bushing, according to an example embodiment.
Figure 19:
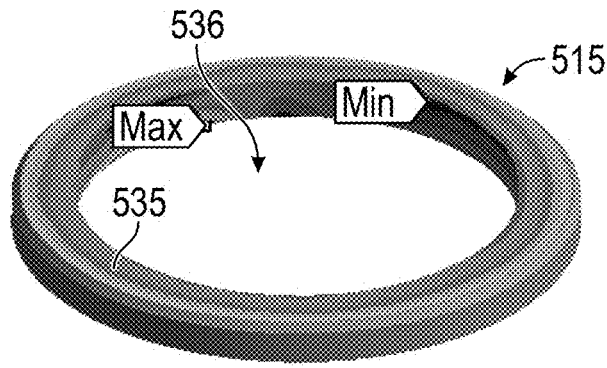
Figure 20:
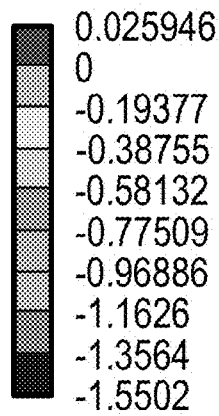
FIG. 20 is another stress distribution depiction of the residual stress in the component of a bushing of FIG. 19, according to an example embodiment.
Figure 20:
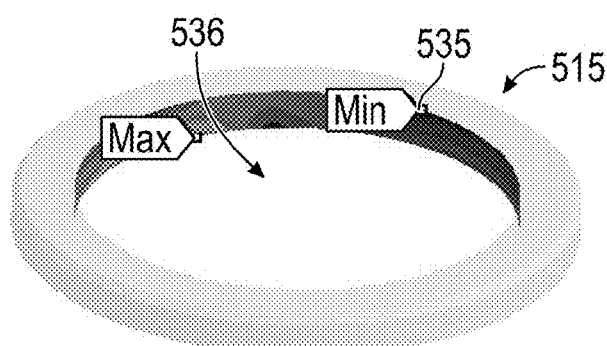
Figure 21:
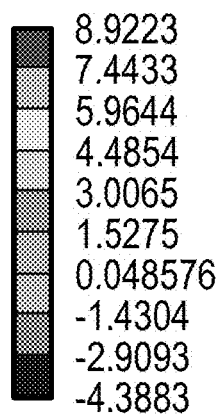
FIG. 21 is another stress distribution depiction of the residual stress in the component of a bushing of FIG. 19, according to an example embodiment.
Figure 21:
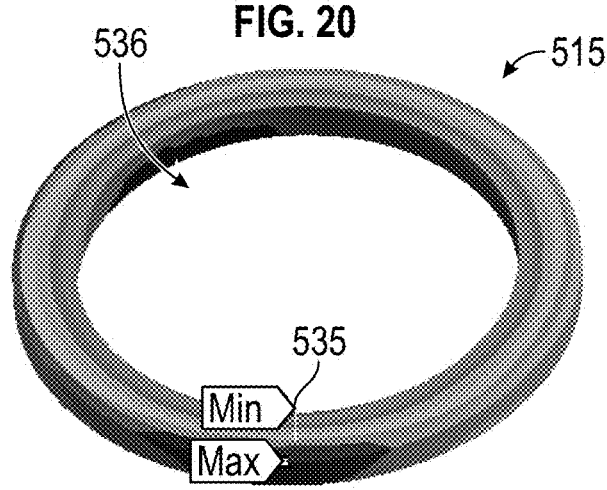
Figure 22:
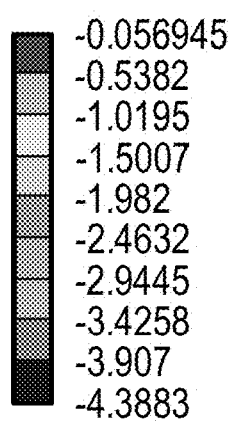
FIG. 22 is another stress distribution depiction of the residual stress in the component of a bushing of FIG. 19, according to an example embodiment.
Figure 22:
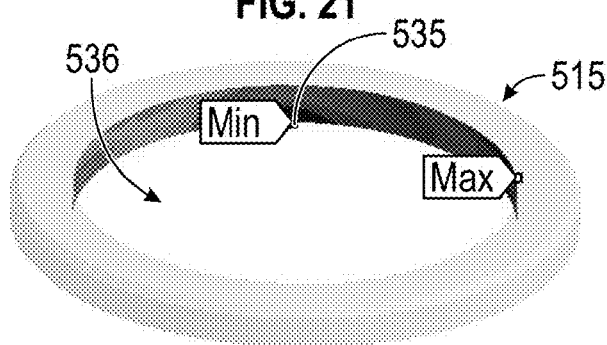

Referring now to FIGS. 17 and 18, a stress distribution depiction of the radial residual stress and the hoop residual stress, respectively, in a cylindrical component 514 of a multi-piece bushing are shown, according to an example embodiment. The cylindrical component 514 may be the same or similar to the cylindrical components 114, 214, and 314 described further herein. For example, the bushing 514 may be installed into an opening of a structure such that an aperture 513 in the cylindrical component 514 may receive a fastener. The residual stress in the cylindrical component 514 corresponds with the stress experienced by the cylindrical component 514 when installed into the structure and the corresponding fastening assembly is in the unloaded state. As shown, the cylindrical component 514 includes a layer for radial compressive residual stress layer 525 on an outside portion of the cylindrical component 514 and a hoop compressive residual stress layer 526 on an inside portion of the cylindrical component 514 as a result of the cold expanded multi-piece bushing, thereby increasing the fatigue strength of the cylindrical component 514 (e.g., as compared to the single piece bushing 14 described above with respect to FIGS. 1-9).

Referring now to FIGS. 19-22, a stress distribution depiction of the radial residual stress (FIGS. 19 and 20) and the hoop residual stress (FIGS. 21 and 22) in a ring 515 of a multi-piece bushing are shown, according to an example embodiment. As shown, the ring 515 includes a layer for radial compressive residual stress layer 535 proximate an inner opening 536 of the ring as a result of the cold expansion, thereby increasing the fatigue strength of the ring 515 (e.g., as compared to the single piece bushing 14 described above with respect to FIGS. 1-9).

Figure 23:
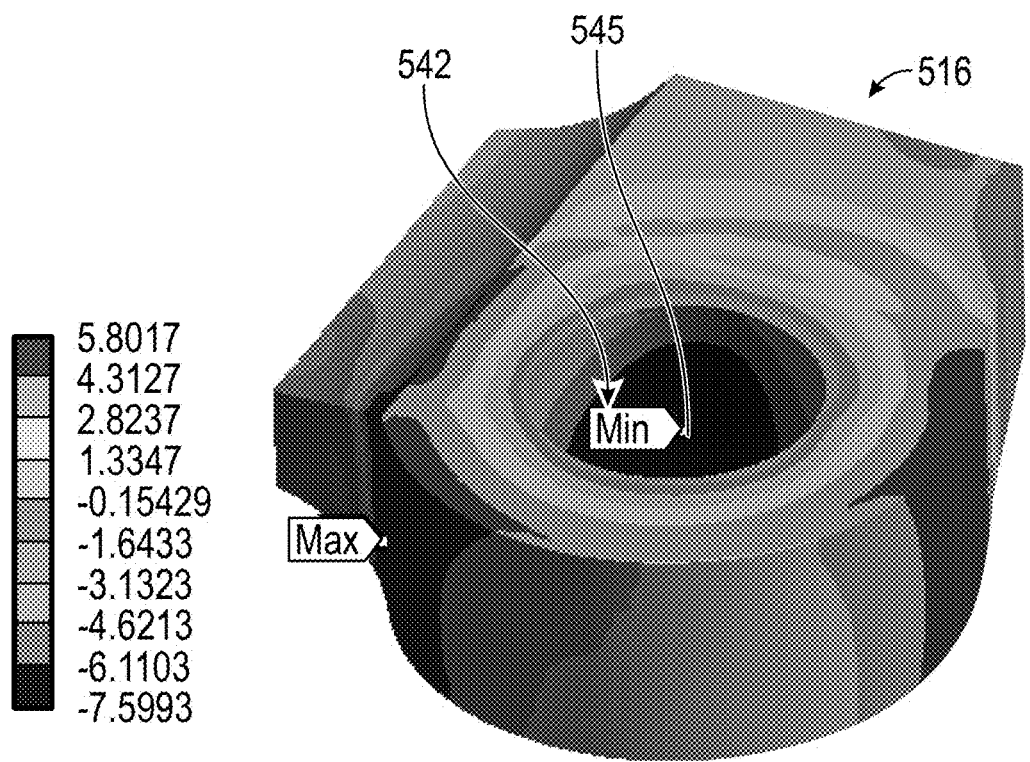
FIG. 23 is a stress distribution depiction of the residual stress in a structure, according to an example embodiment.
Figure 24:
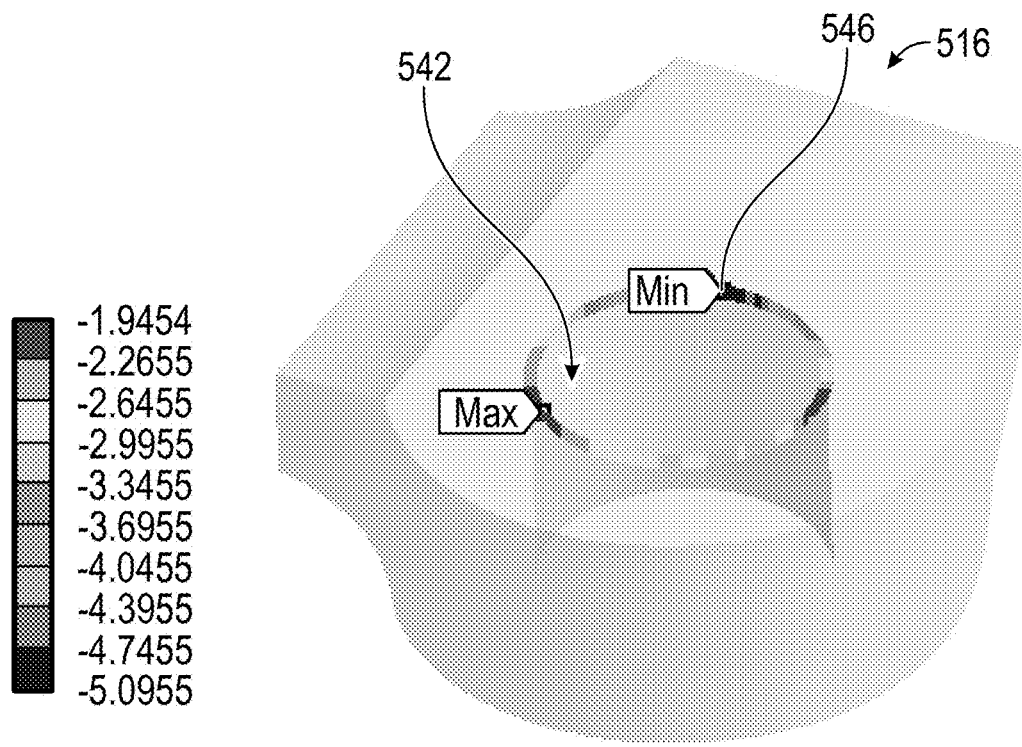
FIG. 24 is another stress distribution depiction of the residual stress in the structure of FIG. 23, according to an example embodiment.

Referring now to FIGS. 23 and 24, a stress distribution depiction of the residual stress in a structure 516 are shown, according to an example embodiment. The structure 516 may be similar to the other structures described herein. For example, the residual stress shown in the structure 516 may be the result of the cold expanding a multi-piece bushing within an opening 542 in the structure 516. As shown, the structure 516 includes a compressive residual stress layer proximate the opening 542 of the structure, thereby increasing the fatigue strength of the structure 516 (e.g., as compared to the single piece bushing 14 described above with respect to FIGS. 1-9). According to various embodiments, eliminating the chamfer in the opening 542 results in a significant decrease in residual tensile stress along the edge of the opening 542, as compared to the embodiment discussed above in FIGS. 1-9.

Figure 25:
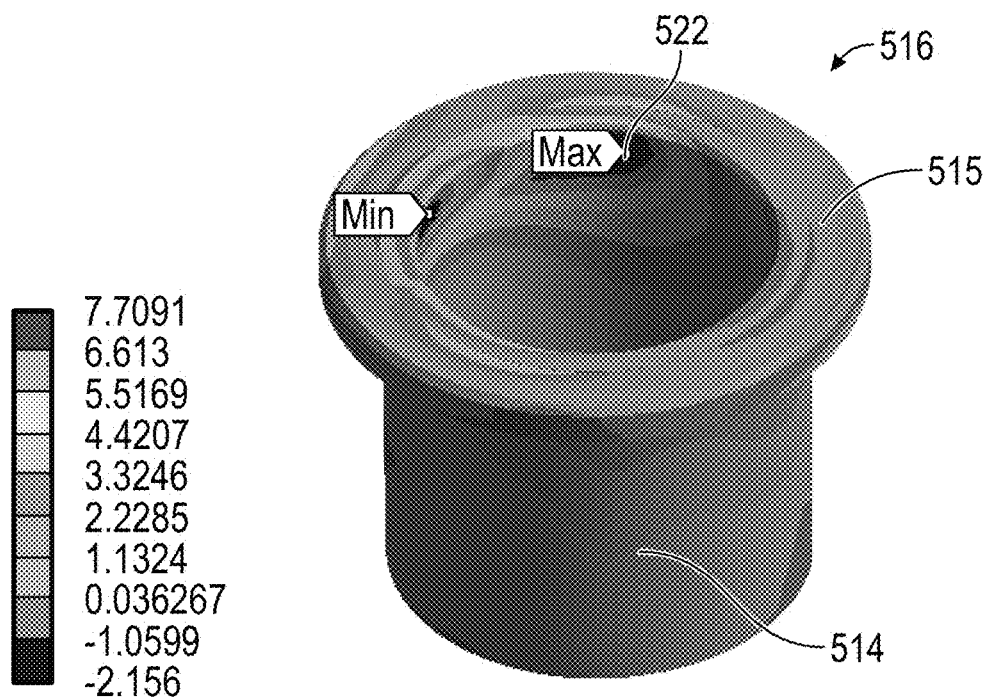
FIG. 25 is a stress distribution depiction of a multi-piece bushing under loaded conditions, according to an example embodiment.
Figure 26:
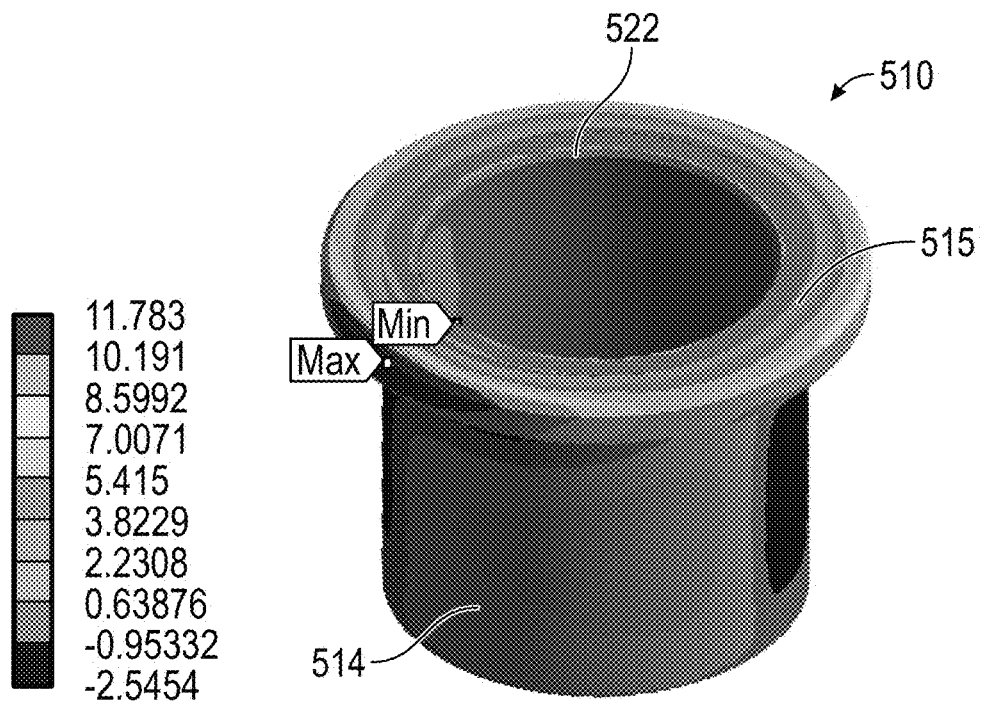
FIG. 26 is another stress distribution depiction of the multi-piece bushing of FIG. 25 under loaded conditions, according to an example embodiment.

Referring now to FIGS. 25 and 26, a vibratory and steady stress distribution depiction of a multi-piece bushing 510 under loaded conditions are shown, according to an example embodiment. For example, the bushing 510 may be installed into the opening 545 of the structure 516 (see FIG. 23) such the bushing 510 may receive a fastener. The bushing 510 may be under a loaded state due to dynamic movement of the structure 516. As shown, the bushing 510 experiences relatively low local stress concentrations proximate a shoulder 522 of the bushing 510 as compared to the single piece bushing 14 described above which increases the fatigue strength of the bushing 510. The reduced stress experienced by the multi-piece bushing 510 may be at least partially attributable to the cold expansion of the bushing 510 within the structure 516.

Figure 27:
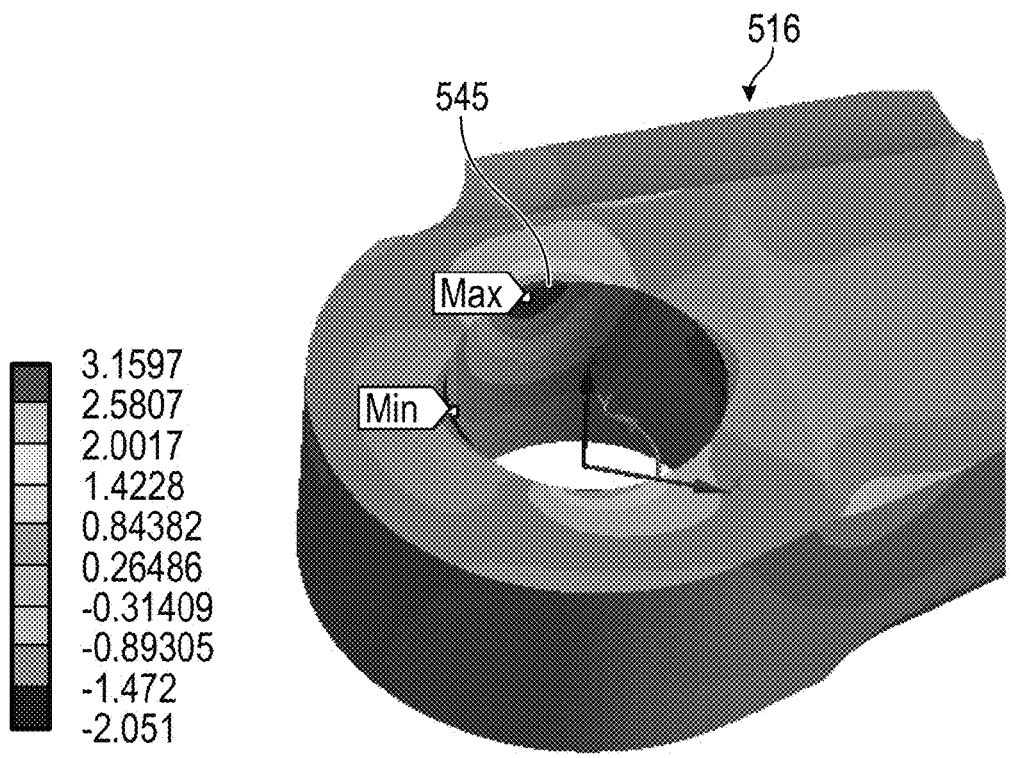
FIG. 27 is a stress distribution depiction of the stress in a structure under loaded conditions, according to an example embodiment, according to an example embodiment.
Figure 28:
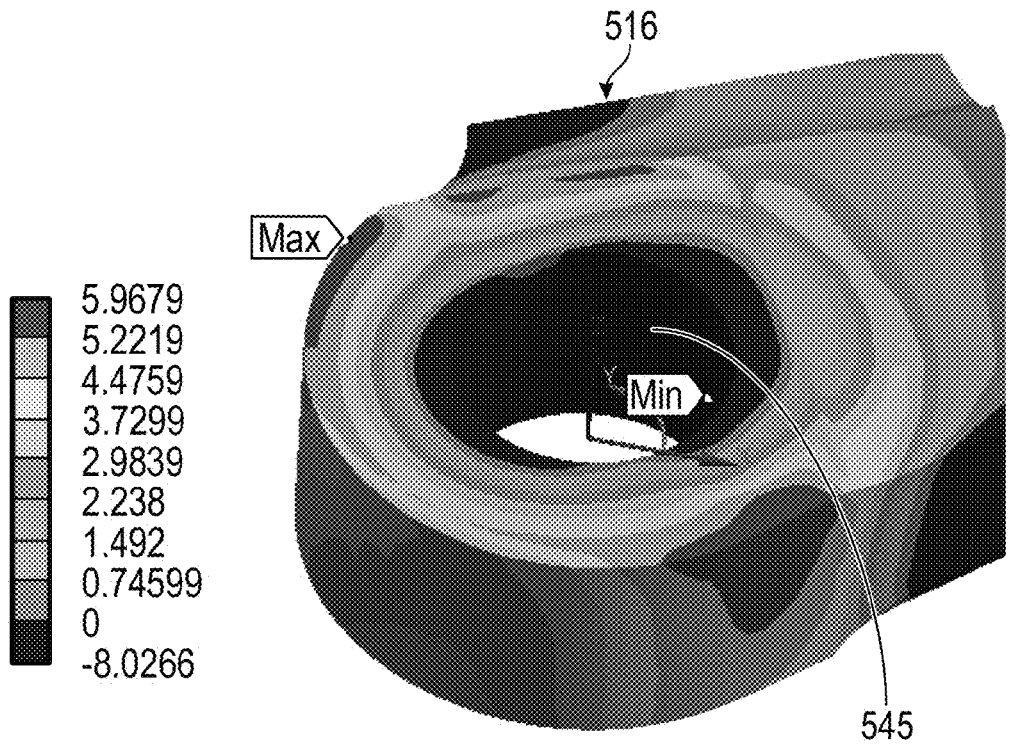
FIG. 28 is another stress distribution depiction of the stress in the structure of FIG. 27 under loaded conditions, according to an example embodiment, according to an example embodiment.

Referring now to FIGS. 27 and 28, stress distribution depictions of the vibratory and steady stress in the structure 516 under loaded conditions are shown, according to an example embodiment. For example, FIG. 27 illustrates the vibratory stress in the structure 516 under loaded conditions and FIG. 28 illustrates the steady stress in the structure 516 under loaded conditions. The structure 516 is shown in loaded conditions while being used in conjunction with a multi-piece bushing (e.g., the bushing 510). As shown, the structure 516 experiences relatively low local stress concentrations (e.g., proximate the opening 545) as compared to the structure 16 being used in conjunction with single piece bushing 14 described above. This is particularly evident when comparing steady stresses at the edge/chamfer of the openings. The reduced stress experienced by the structure 516 may be at least partially attributable to the cold expansion of the bushing 510 within the structure 516.

Figure 29:
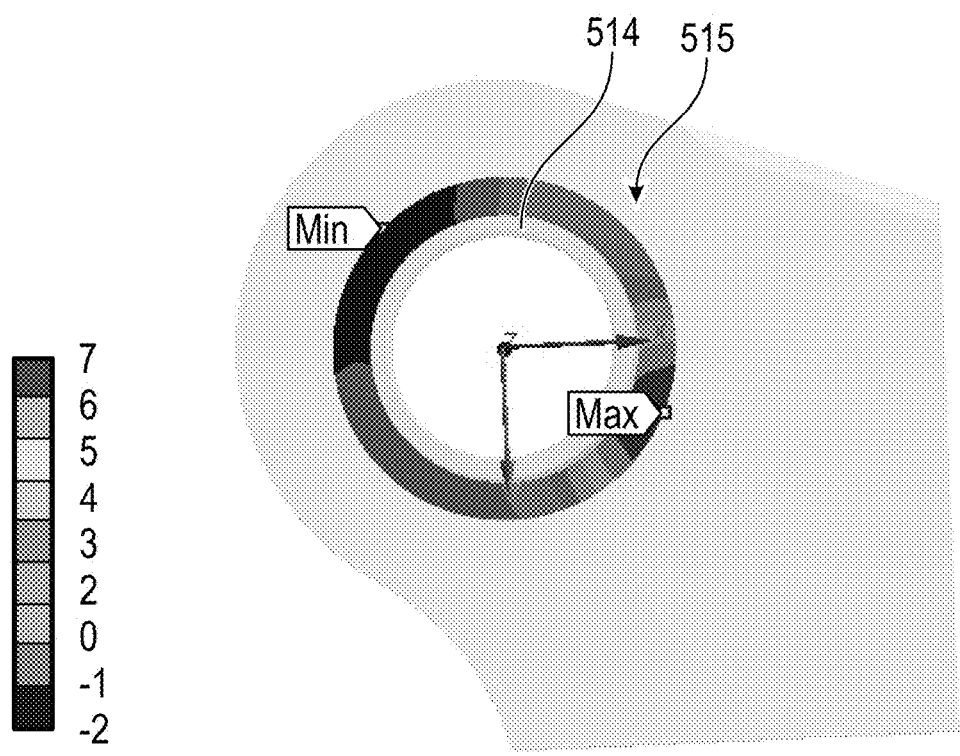
FIG. 29 is a deformation distribution depiction of a ring positioned within the structure of FIG. 28, according to an example embodiment.

Referring now to FIG. 29, a deformation distribution depiction of the ring 515 positioned within the structure 516 is shown, according to an example embodiment. The ring 515 is one of the components of a multi-piece bushing (e.g., the bushing 510). As shown, the ring 515 experiences similar magnitudes of deformation compared to the ring portion 18 of the single piece bushing 14 described above.

Figure 30:
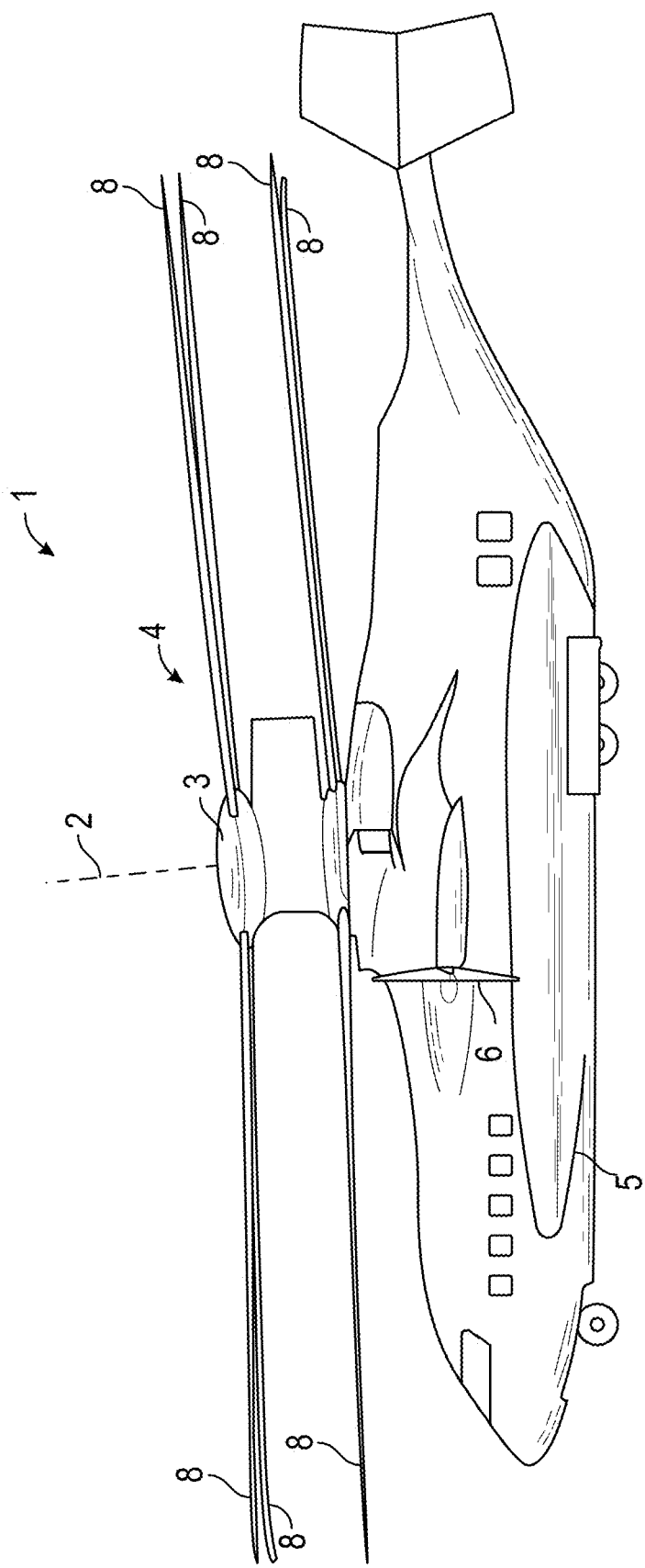
FIG. 30 is a perspective view of a rotary-wing aircraft, according to an example embodiment.

Referring now to FIG. 30, a rotary-wing aircraft 1 is shown according to an example embodiment. The rotary-wing aircraft 1 includes a dual, counter-rotating, coaxial rotor system 4. The rotor system 4 includes a rotor head 3 and a plurality of blade spars 8 which rotate about an axis of rotation 2. The rotary-wing aircraft 10 includes an airframe 5 which supports the dual, counter rotating, coaxial rotor system 4 as well as a propulsive system 6 which provides translational thrust generally parallel to an aircraft longitudinal axis. It should be appreciated that while the rotary-wing aircraft 1 shows the propulsive system 6 near the center of the rotary-wing aircraft 1, the propulsive system 6 may be located elsewhere, such as near the tail of the rotary-wing aircraft 1. According to various embodiments, one or more of the fastening assemblies described herein (e.g., the fastening assembly 100, the fastening assembly 200, etc.) may be used as a part of coupling one or more components of the rotary-wing aircraft 10 to one another. For example, one or more of the plurality of blade spars 8 may be coupled to the rotor head 3 via a fastening assembly.

Figure 31:
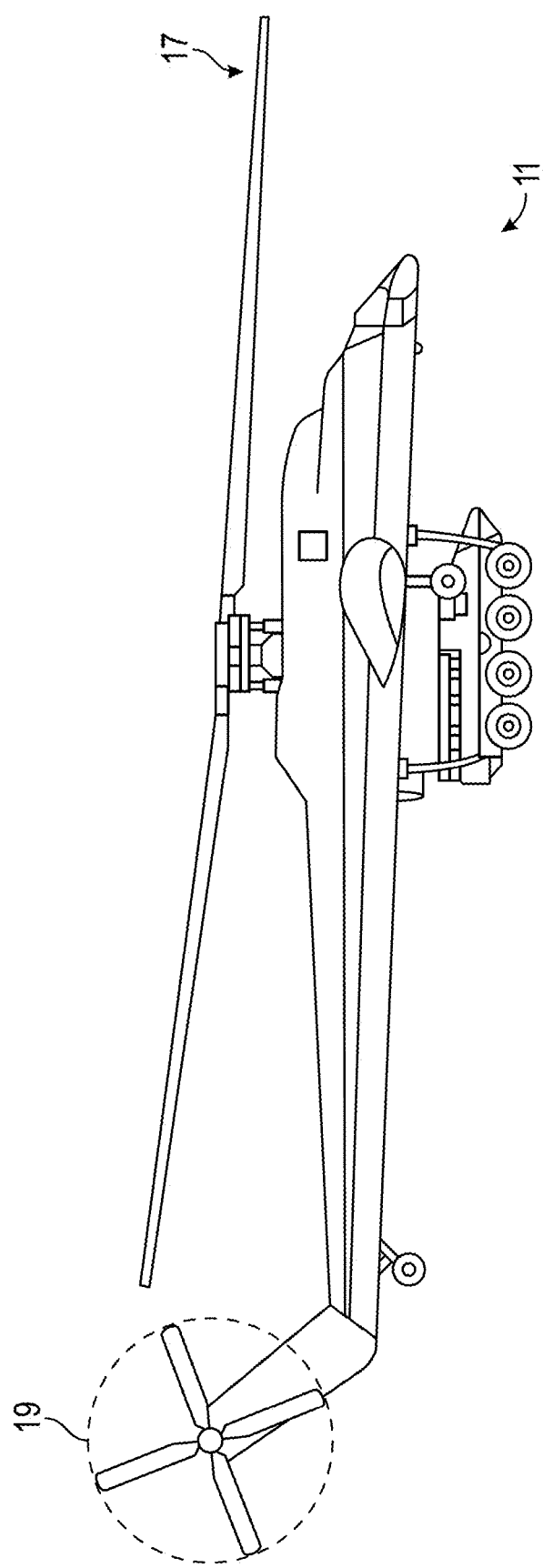
FIG. 31 is a perspective view of a single rotor flying helicopter, according to an example embodiment.

Referring now to FIG. 31, a perspective view of a single rotor flying helicopter 11 is shown according to an example embodiment. The helicopter includes a single main rotor assembly 17 and an anti-torque rotor 19 mounted to an extended tail. According to various embodiments, one or more of the fastening assemblies described herein (e.g., the fastening assembly 100, the fastening assembly 200, etc.) may be used as a part of coupling one or more components of the rotary-wing aircraft 10 to one another. It should be appreciated that the two particular types of rotary-wing aircraft configuration illustrated in FIGS. 31 and 32 are exemplary in nature and not intended to be limiting.

Various numerical values herein are provided for reference purposes only. Unless otherwise indicated, all numbers expressing quantities of properties, parameters, conditions, and so forth, used in the specification and claims are to be understood as being modified in all instances by the term "about" or "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "about" or "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. The devices, systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A bushing assembly for a structure comprising a first aperture, the bushing assembly comprising:
    a first component configured to be received by the first aperture and comprising a second aperture, a maximum width of the first component defining an outer diameter, and
    a second component coupled to the first component via pressure fit and configured to be positioned outside of the first aperture and coupled to the first component, the second component comprising a third aperture extending through the second component, the third aperture being dimensioned so as to be equivalent to the outer diameter of the first component, and the first component and the second component being formed as discrete components of the bushing assembly, the second component shaped as a flat, disc-shaped ring surrounding an entirety of the outer diameter of the first component such that an outermost portion of the bushing assembly in a radial direction is defined by the second component, wherein the first component comprises a residual compressive stress layer formed by cold expanding the first component into the first aperture and the third aperture simultaneously.

2. The bushing assembly of claim 1, wherein the first component and the second component define a quadrilateral shoulder.

3. The bushing assembly of claim 2, wherein the first aperture defines a quadrilateral ledge, wherein the quadrilateral shoulder interfaces with the quadrilateral ledge.

4. The bushing assembly of claim 1, wherein the first aperture extends through the structure; and
    wherein the bushing assembly further comprises a third component coupled to the first component and positioned outside of the first aperture and opposite the second component such that the structure is positioned between the second component and the third component, wherein the first component and the third component are discrete components.

5. The bushing assembly of claim 1, wherein at least a portion of the bushing assembly is coated in an anti-fretting material.

6. A system comprising:
    a rotor head; and
    a bushing configured to be installed in an opening of the rotor head, comprising:
        a tubular component extending between a first end and a second end, the tubular component defining an inner diameter and an outer diameter, wherein the outer diameter corresponds with a maximum width of the tubular component; and a flat, disc-shaped ring coupled to the tubular component proximate the first end via pressure fit, the ring comprising a central opening penetrating through the ring, wherein a diameter of the central opening is substantially equivalent in size to the outer diameter, the ring surrounding an entirety of the outer diameter of the tubular component such that an outermost portion of the bushing in a radial direction is defined by the ring, wherein the tubular component comprises a residual compressive stress layer formed by cold expanding the tubular component into the central opening of the ring and the central opening simultaneously.

7. The system of claim 6, wherein the tubular component and the ring define a quadrilateral shoulder.

8. The system of claim 6, wherein the ring is a first ring, and the bushing further comprises a second ring coupled to the tubular component proximate the second end, wherein the second ring is distinct from the first ring and the tubular component.

9. The system of claim 6, wherein at least a portion of the bushing is coated in an anti-fretting material.

10. A method of installing a multi-piece bushing in a structure comprising a first aperture, comprising:
providing a tubular component partially within the first aperture, wherein the tubular component includes a second aperture extending from a first end to a second end and defines an outer diameter corresponding with a maximum width of the tubular component; and
coupling a flat, disc-shaped ring to the tubular component proximate the first end by pressure fitting the tubular component to the ring such that the ring is positioned outside of the first aperture, wherein the ring includes a third aperture that extends completely though the ring, wherein the third aperture is substantially the same size as the outer diameter, the ring surrounding an entirety of the outer diameter of the tubular component such that an outermost portion of the multi-piece bushing in a radial direction is defined by the ring, wherein coupling the ring to the tubular component comprises simultaneously cold expanding the tubular component in the first aperture and the third aperture simultaneously.

11. The method of claim 10, further comprising providing a fastener within the tubular component such that the structure is coupled to the fastener.

12. The method of claim 10, wherein the ring is a first ring, and the method further comprises coupling a second ring to the tubular component such that the second ring is positioned outside of the first aperture.

13. The method of claim 10, wherein at least a portion of the first aperture and a portion of the ring are coated in an anti-fretting material.

14. The method of claim 10, wherein the tubular component includes a residual compressive stress layer.

15. The method of claim 12, wherein the tubular component is cold expanded while the tubular component is positioned within the first aperture, the first ring surrounds a portion of the tubular component, and the second ring surrounds a portion of the tubular component.

\* \* \* \* \*